(12) United States Patent
Carlisle et al.

(10) Patent No.: US 11,467,136 B2
(45) Date of Patent: Oct. 11, 2022

(54) CHAMBERED SEPTUM

(71) Applicant: Chromatography Research Supplies, Inc., Louisville, KY (US)

(72) Inventors: Christopher A. Carlisle, Louisville, KY (US); Mohamed M. Marei, Louisville, KY (US); David L. Jones, Louisville, KY (US); Edward J. Heiny, Houston, TX (US); David S. Hubbard, Louisville, KY (US)

(73) Assignee: Chromatography Research Supplies, Inc., Louisville, KY (US)

( * ) Notice: Subject to any disclaimer, the term of this patent is extended or adjusted under 35 U.S.C. 154(b) by 214 days.

(21) Appl. No.: 16/217,266

(22) Filed: Dec. 12, 2018

(65) Prior Publication Data

US 2019/0187110 A1  Jun. 20, 2019

Related U.S. Application Data

(60) Provisional application No. 62/608,021, filed on Dec. 20, 2017.

(51) Int. Cl.
*G01N 30/18* (2006.01)
*G01N 30/60* (2006.01)
*G01N 30/02* (2006.01)

(52) U.S. Cl.
CPC ......... *G01N 30/18* (2013.01); *G01N 30/6026* (2013.01); *G01N 2030/025* (2013.01); *G01N 2030/185* (2013.01)

(58) Field of Classification Search
CPC ....... G01N 2030/025; G01N 2030/185; G01N 30/18; G01N 30/6026; G01N 35/1079
See application file for complete search history.

(56) References Cited

U.S. PATENT DOCUMENTS

| | | | | |
|---|---|---|---|---|
| 3,757,981 A | * | 9/1973 | Harris, Sr. | F16K 13/00 |
| | | | | 215/247 |
| 3,939,713 A | * | 2/1976 | Estey | G01N 30/18 |
| | | | | 73/864.86 |
| 4,084,718 A | | 4/1978 | Wadsworth | |
| 4,414,857 A | * | 11/1983 | Brazhnikov | G01N 30/12 |
| | | | | 73/863.11 |
| 4,904,241 A | | 2/1990 | Bark | |

(Continued)

FOREIGN PATENT DOCUMENTS

| | | | | |
|---|---|---|---|---|
| ES | 2262805 | | 12/2006 | |
| WO | WO0236182 | | 10/2002 | |
| WO | WO-2008121819 A1 | * | 10/2008 | ............. G01N 30/18 |

OTHER PUBLICATIONS

International Search Report and Written Opinion, dated Mar. 14, 2019—International Application No. PCT/US2018/065662.

*Primary Examiner* — John Fitzgerald
*Assistant Examiner* — Truong D Phan
(74) *Attorney, Agent, or Firm* — Dentons Bingham Greenebaum LLP; Brian W. Chellgren; James C. Eaves, Jr.

(57) ABSTRACT

A septum contains at least one internal chamber along the central axis of the septum. The chamber provides relief space into which the sealing sections of the septum can deform as a needle passes through the septum. Incorporation of the chamber reduces surface area contact and friction between the septum and needle, which results in reduced septum tearing and reduced production of particulate matter from abrasion.

20 Claims, 24 Drawing Sheets

(56) References Cited

U.S. PATENT DOCUMENTS

| | | | | |
|---|---|---|---|---|
| 4,954,149 | A * | 9/1990 | Fullemann | G01N 30/18 210/198.2 |
| 5,269,763 | A * | 12/1993 | Boehmer | A61M 39/0606 251/149.1 |
| 5,531,810 | A * | 7/1996 | Fullemann | G01N 30/18 210/198.2 |
| 6,258,065 | B1 * | 7/2001 | Dennis | A61B 17/3462 604/167.01 |
| 6,526,812 | B2 * | 3/2003 | Martin | G01N 30/18 422/70 |
| 8,677,844 | B2 * | 3/2014 | Monse | G01N 30/18 73/864.85 |
| 9,482,650 | B2 * | 11/2016 | Lemelin | F16J 15/102 |
| 9,874,546 | B2 * | 1/2018 | McCauley | G01N 30/18 |
| 9,931,274 | B2 * | 4/2018 | Py | A61J 1/1406 |
| 10,335,347 | B2 * | 7/2019 | Carrel | B65D 43/18 |
| 10,859,540 | B2 * | 12/2020 | Carlisle | G01N 30/18 |
| 2002/0177814 | A1 | 11/2002 | Meng et al. | |
| 2004/0016341 | A1 * | 1/2004 | Tipler | G01N 30/12 95/82 |
| 2004/0108293 | A1 * | 6/2004 | Brockwell | B01L 3/50825 215/247 |
| 2008/0066815 | A1 * | 3/2008 | Anderson | F16K 15/147 137/846 |
| 2014/0150660 | A1 * | 6/2014 | Klee | B01D 53/02 96/106 |
| 2015/0013811 | A1 * | 1/2015 | Carrel | A61J 7/0472 137/798 |
| 2015/0148756 | A1 * | 5/2015 | Lynn | A61M 39/10 604/256 |
| 2019/0308189 | A1 * | 10/2019 | Roos | G01N 35/1079 |

\* cited by examiner

CHAMBERED SEPTUM

CROSS-REFERENCE TO RELATED APPLICATION

This application claims the benefit of priority to U.S. provisional patent application Ser. No. 62/608,021, filed Dec. 20, 2017, for CHAMBERED SEPTUM, incorporated herein by reference.

FIELD OF THE INVENTION

A septum contains at least one internal chamber along the central axis of the septum. The chamber provides relief space into which the sealing sections of the septum can deform as a needle passes through the septum. Incorporation of the chamber reduces surface area contact and friction between the septum and needle, which results in reduced septum tearing and reduced production of particulate matter from abrasion.

BACKGROUND OF THE INVENTION

Gas chromatography ("GC") is a widely-used analytical technique with high sensitivity. Typically, liquid samples are injected through an elastomeric seal ("septum", usually made from silicone rubber or other elastomers) into a hot injection port where the sample is vaporized in an inert gas stream, and components are separated as the stream is swept through a chromatographic column. Components eluting from the column are detected with highly sensitive detectors. Inertness and reproducibility of injection are essential to maintain a high level of accuracy in detection.

The primary purpose of the septum is to seal against carrier gas leakage so the sample properly elutes through the chromatographic column. Ideally, the septum must serve as an effective, gas-tight seal for up to hundreds of injections, each requiring a needle to pierce through the thickness of the septum. The septum may be exposed to temperatures ranging from ambient temperature to nearly 300° C., and to gas pressures up to nearly 100 psi.

GC septa currently used in laboratories largely meet the requirement to seal reliably, and essentially follow a single basic design: a solid disk or plug of polymeric material through which the needle pierces and injects the sample. While this basic design does function effectively as a seal, one problem that has not been solved so far is the unintentional introduction of contaminating particles into the GC inlet. Repeated passage of a needle through a septum abrades the septum and roughens the needle, leading to particulate septum material and metal fines from the needle being brushed into the inlet. The septum material adds volatile contamination to the chromatographic baseline, which can appear as peaks that interfere with desired peaks from the sample components, and both the septum material and metal fines potentially act as adsorbents or catalysts, removing or degrading components in the inlet before they can be detected.

To reduce particle generation in standard septa it is well known in the art that septa should not be over-tightened on installation, to avoid over-compression in the inlet, increased friction between the needle and septum, and a potential increase in particle generation. Innovations to this standard design have been introduced over time to improve performance and decrease particle generation. One example is to add a chamfer, a typically cone-shaped cavity in the outer surface of the septum, to help restrict the needle to one path through the septum. Another example is to pre-pierce the septum along the expected path of the needle to minimize "coring" (production of septum material particles) in the first few injections. It is also generally known that thinner needles and needles without sharp points decrease particle generation. However thinner needles may also bend more frequently than thicker needles, causing other problems. While these various techniques may reduce generation of contaminating particles, the problem has not yet been satisfactorily resolved.

SUMMARY

It is the object of the present invention to reduce contamination in the GC inlet by providing a novel septum. The septum contains at least one internal chamber along the central axis of the septum. The chamber provides relief space into which the sealing sections of the septum can deform as a needle passes through the septum. Incorporation of the chamber reduces surface area contact and friction between the septum and needle, which results in reduced septum tearing and reduced production of particulate matter from abrasion. Portions of the septum above and below the chamber serve as a relatively thin top seal and a separate, relatively thin, bottom seal. In contrast, in a typical septum, the entire body of the septum serves as a single, relatively thick seal.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
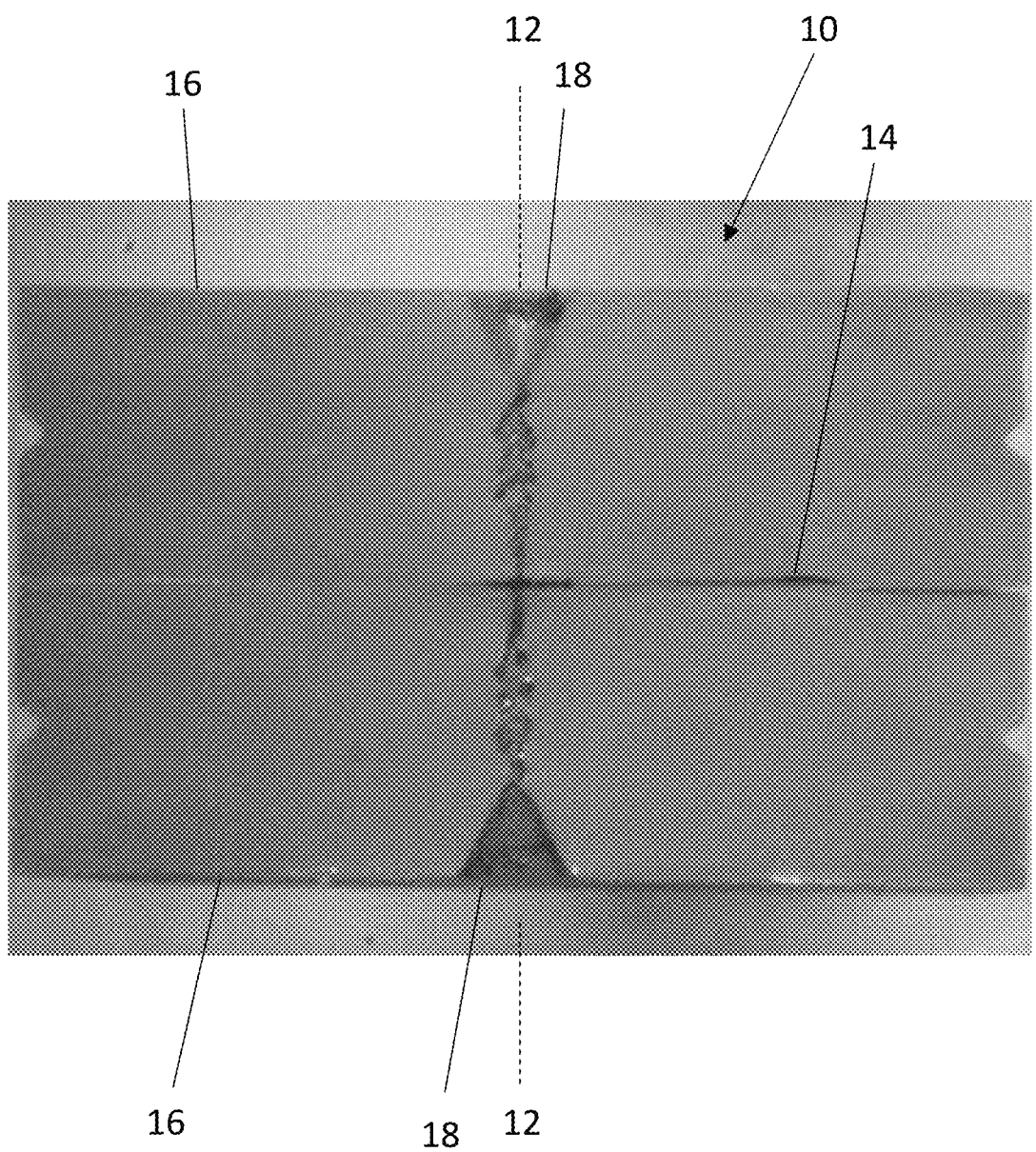
FIG. 1 depicts a cross-sectional view of a standard disc-shaped septum cut in half along its central axis after multiple injections.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. Any quantities referred to as "about" a given value are defined as being within 5% of the stated value unless otherwise specified (e.g., "about 1.0 mm" refers to the range of 0.95 mm to 1.05 mm; "between about 1.0 mm and 2.0 mm" refers to the range of 0.95 mm to 2.1 mm). Discussions pertaining to specific compositions of matter, if present, are presented as examples only and do not limit the applicability of other compositions of matter, especially other compositions of matter with similar properties, unless otherwise indicated. The terms top and bottom are used herein refer to the orientation of septa shown in the drawings and to the movement of a needle, which is inserted into the top of a septum, passes through the septum, and emerges from the bottom. It should be understood that a septum may be mounted on a fitting at various orientations, such that the insertion point "top" may be oriented sideways, at an angle, or upside down.

Particulate contaminants in GC are commonly created by tearing of a septum along its central axis—the typical pathway of a needle passing through the septum during injection. FIG. 1 displays a standard disc-shaped septum 10, as generally known in the art, which has been cut in half along its central axis 12 to reveal the path of the needle. The two halves are displayed with the bottom surfaces 14 adjacent to each other and the top surfaces 16, identified by the chamfered guides 18, opposite each other. As is evident, pieces of silicone rubber have been worn away from the interior of the septum 10 along the central axis 12 during the course of use. This failure mode—abrading and tearing away of material—is well known for silicone rubber. This abrading behavior in the interior of the septum 10 occurs due to compressive and kinetic frictional forces as the needle enters the septum. The septum 10 is mostly contained in a GC instrument fitting when in use, so the compressive stresses on the septum 10 increases as the volume of the needle entering the septum 10 is accommodated. The portions of the septum 10 nearest the top surface 16 and bottom surface 14 experience less abrasion, as the septum can deform into open space as the needle passes through, which reduces tearing of material. However, in the interior of the septum 10, the abrasive forces exceeded the strength and fatigue limits of the silicone rubber, resulting in pieces tearing off the septum 10.

Figure 2A:
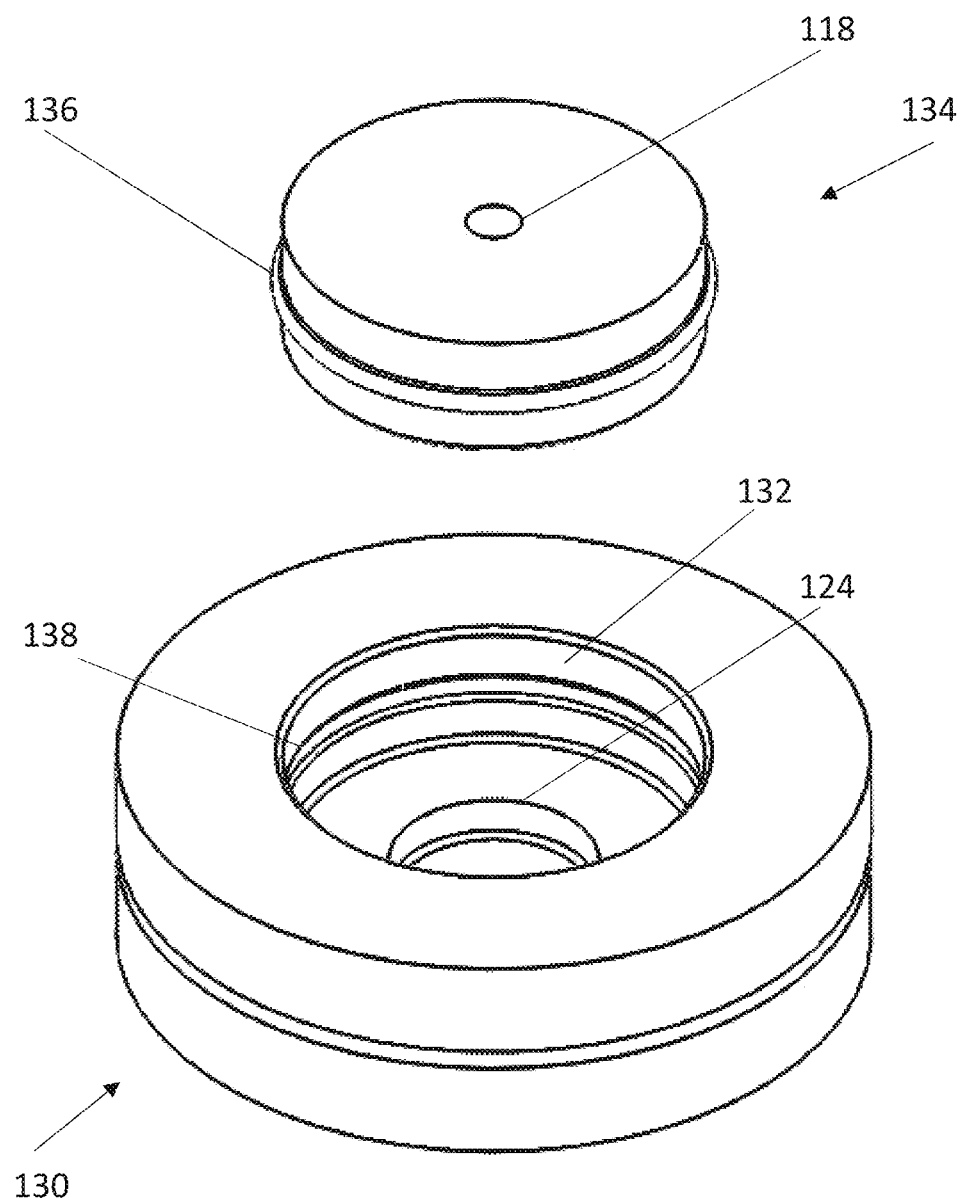
FIG. 2A depicts a perspective view of a first embodiment of a septum with the first portion and second portion of the septum in spaced apart relationship.
Figure 2B:
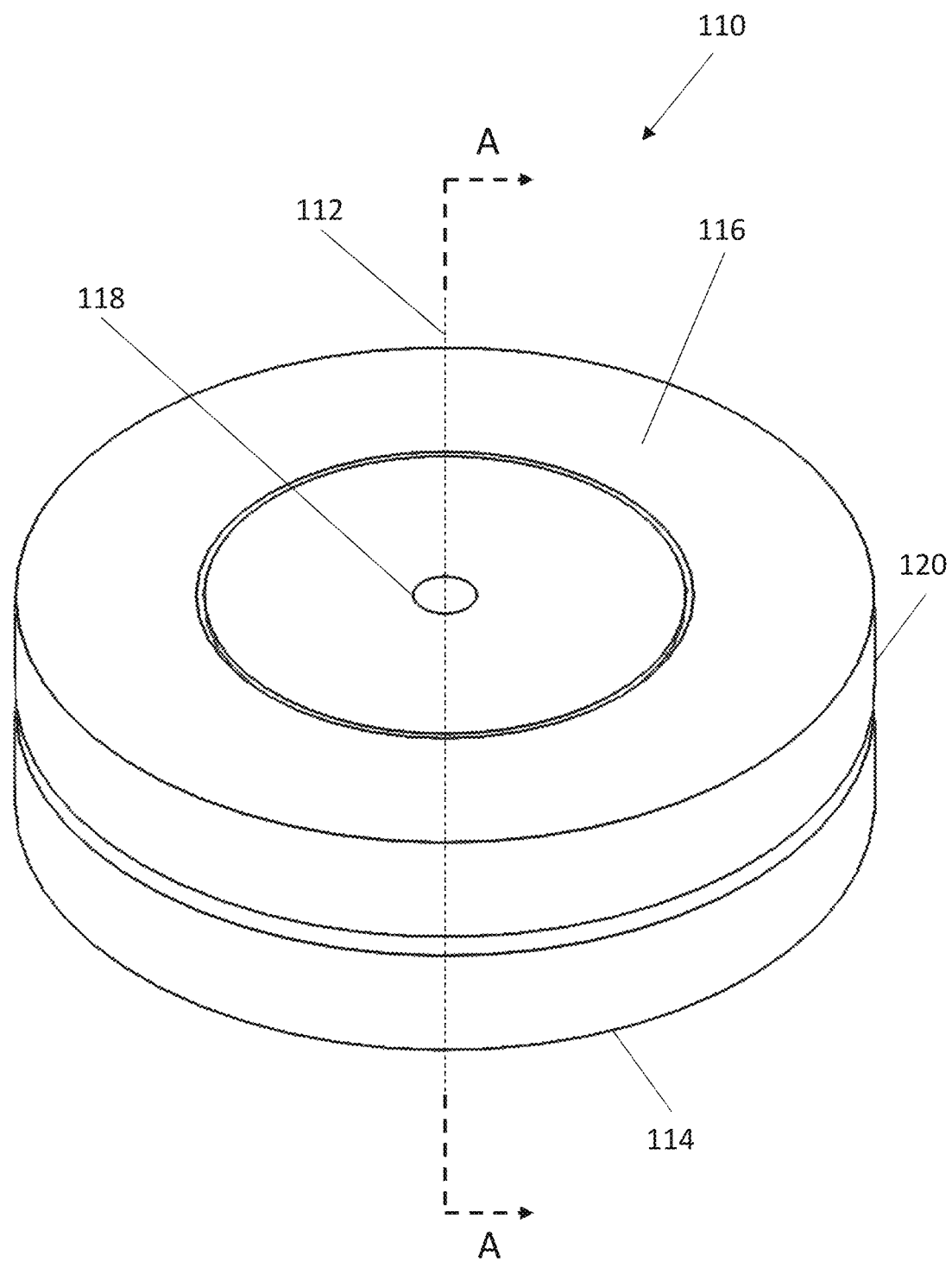
FIG. 2B depicts a perspective view of the first embodiment with the first portion installed within the second portion.
Figure 2C:
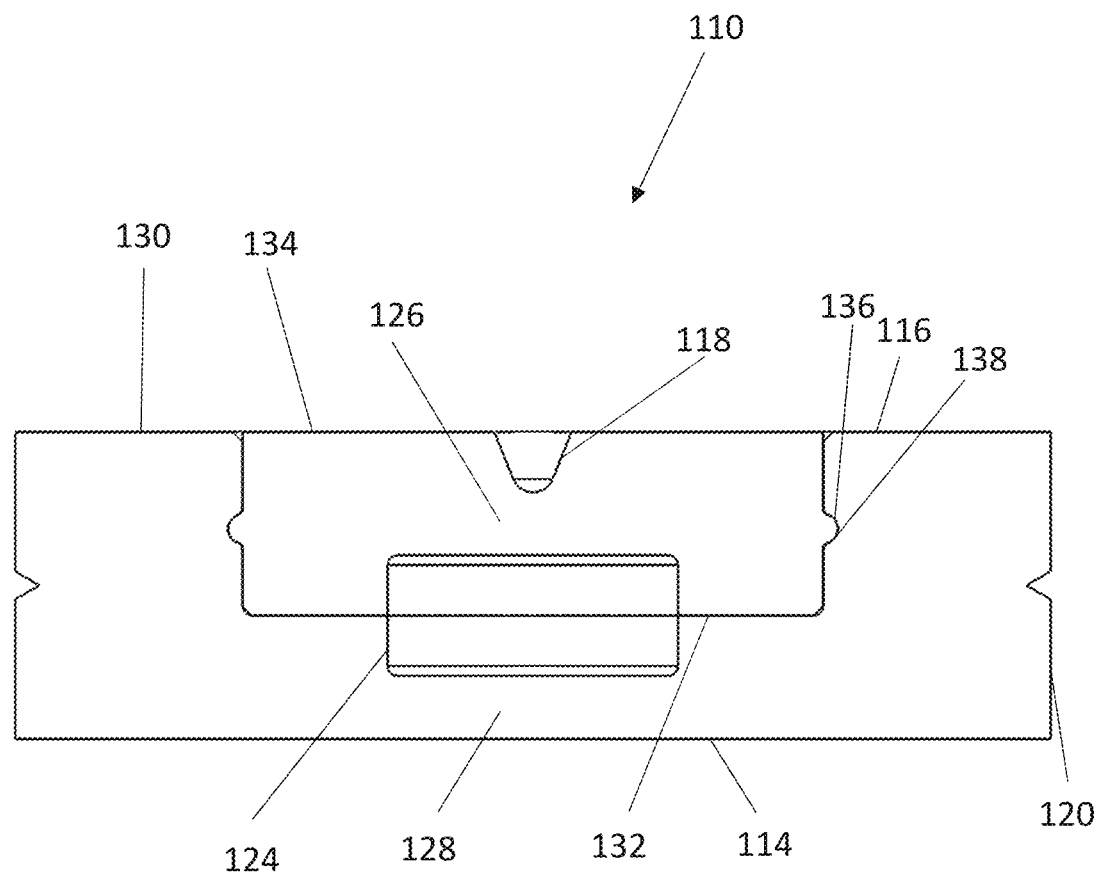
FIG. 2C depicts a cross-sectional view along line A-A of the first embodiment.

FIGS. 2A-2C depict a septum 110 according to a first embodiment of the present invention. In this first embodiment, the septum 110 is generally disc-shaped with a top surface 116, a bottom surface 114 and a side 120 extending between the top surface 116 and the bottom surface 114. The septum 110 has a diameter of about 10.82 mm and a thickness of about 3.17 mm. A central axis 112 extends vertically through the center of the septum 110. In this first embodiment, the top surface 116 includes a cone-shaped upper cavity 118 centered on the central axis 112, the upper cavity 118 having a depth of about 0.89 mm and a diameter of about 1.27 mm. This upper cavity 118 serves to guide a needle inserted into the top surface 116 into passing along the central axis 112.

As shown in FIG. 2C, the septum 110 includes a hollow internal chamber 124 spaced apart from the top surface 116, bottom surface 114, side 120, and upper cavity 118. In some embodiments, the chamber 124 has a diameter in the range of about 1.0 mm to about 3.0 mm and a height in the range of about 0.9 mm to about 1.25 mm. The portion of the septum 110 between the chamber 124 and the lowest point of the cone-shaped upper cavity 118 is referred to as the top seal 126 and has a thickness of about 0.65 mm. The portion of the septum 110 between the chamber 124 and the bottom surface 114 is referred to as the bottom seal 128 and has a thickness of about 0.65 mm. In other embodiments, the thicknesses of the top seal and bottom seal are greater than 0.0 mm and not greater than 2.0 mm. In connection with this and other disclosed embodiments, the thicknesses of the top seal and bottom seal are within the range of 0.3 mm to 1.2 mm or within the range of 0.5 mm to 0.8 mm. As should be readily understood, the preceding dimensions are provided for example purposes only and larger and smaller septa are envisioned.

In some embodiments, the septum 110 is formed in two parts for ease of manufacture. The larger second portion 130 includes a generally cylindrical-shaped recess 132 sized and shaped to receive the generally cylindrical-shaped first portion 134, the internal chamber 124 being formed between the first and second portions 134, 130. In the depicted embodiment, the first portion 134 includes a raised ridge 136 extending around the circumference of the first portion 134 and the second portion 130 includes a corresponding groove 138 extending around the circumference of the recess 132, such that the first portion 134 and second portion 130 engage each other via a tongue-and-groove fit. In alternative embodiments, the first portion 134 and second portion 130 may engage via a retaining ring, friction fit, an adhesive, chemical bonding, or other means known in the art.

Figure 3A:
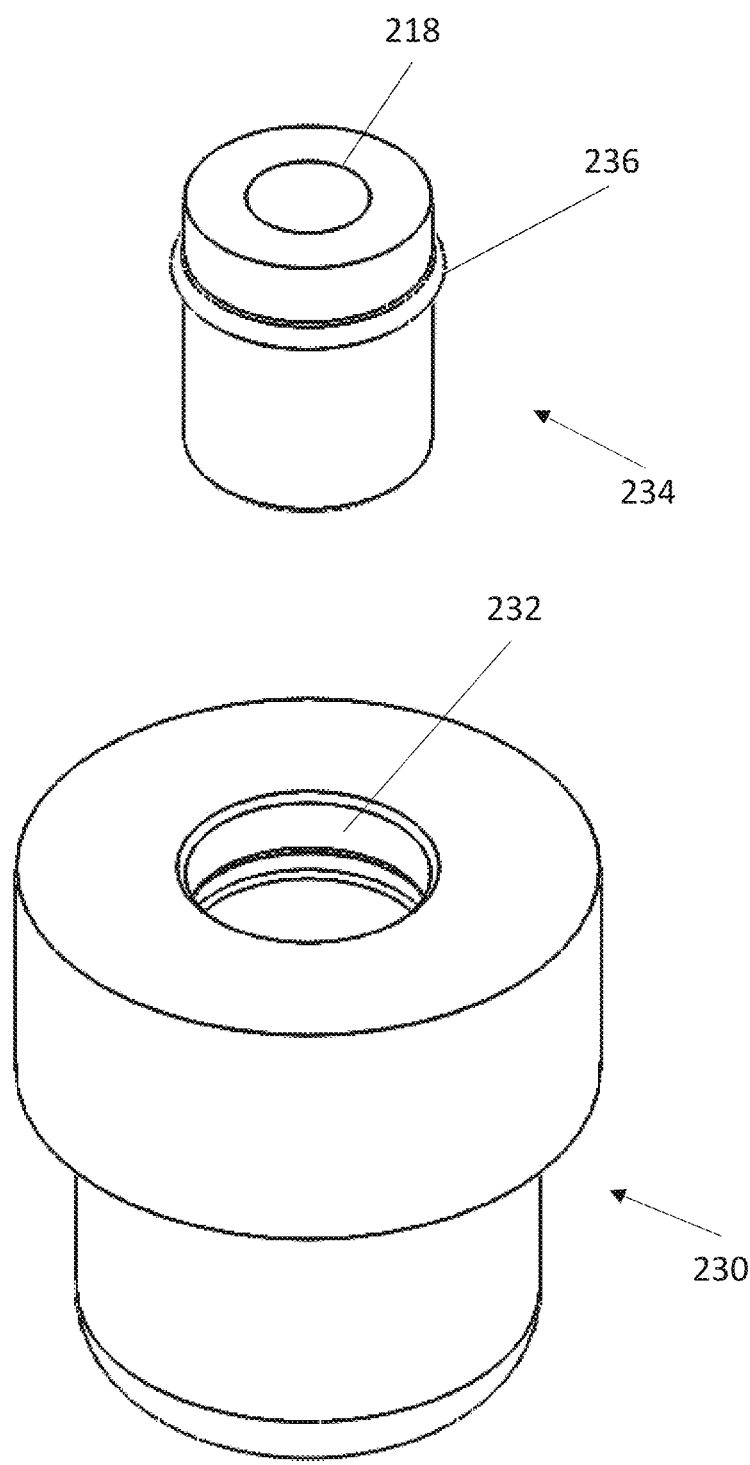
FIG. 3A depicts a perspective view of a second embodiment of a septum with the first portion and second portion of the septum in spaced apart relationship.
Figure 3B:
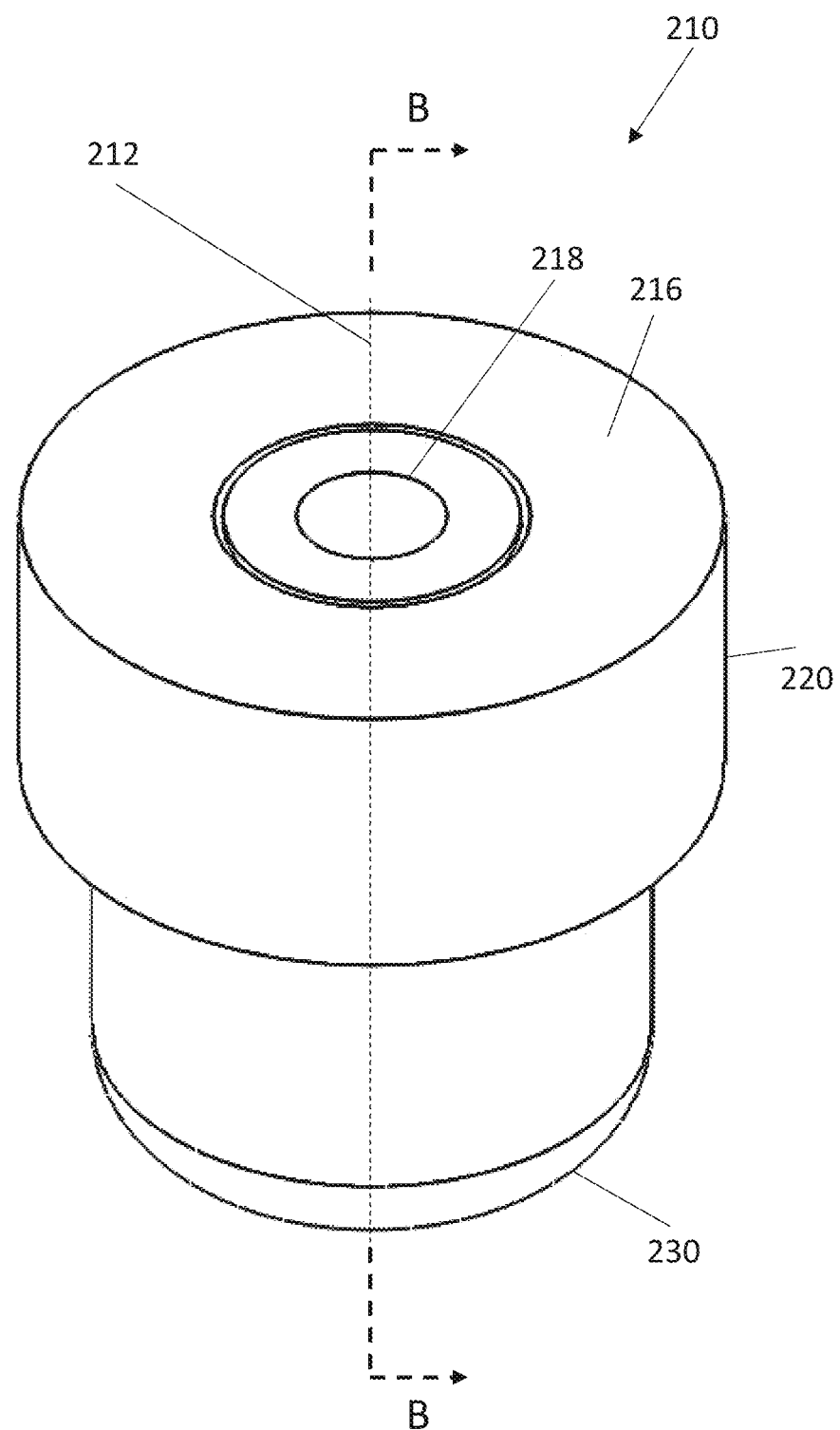
FIG. 3B depicts a perspective view of the second embodiment with the first portion installed within the second portion.
Figure 3C:
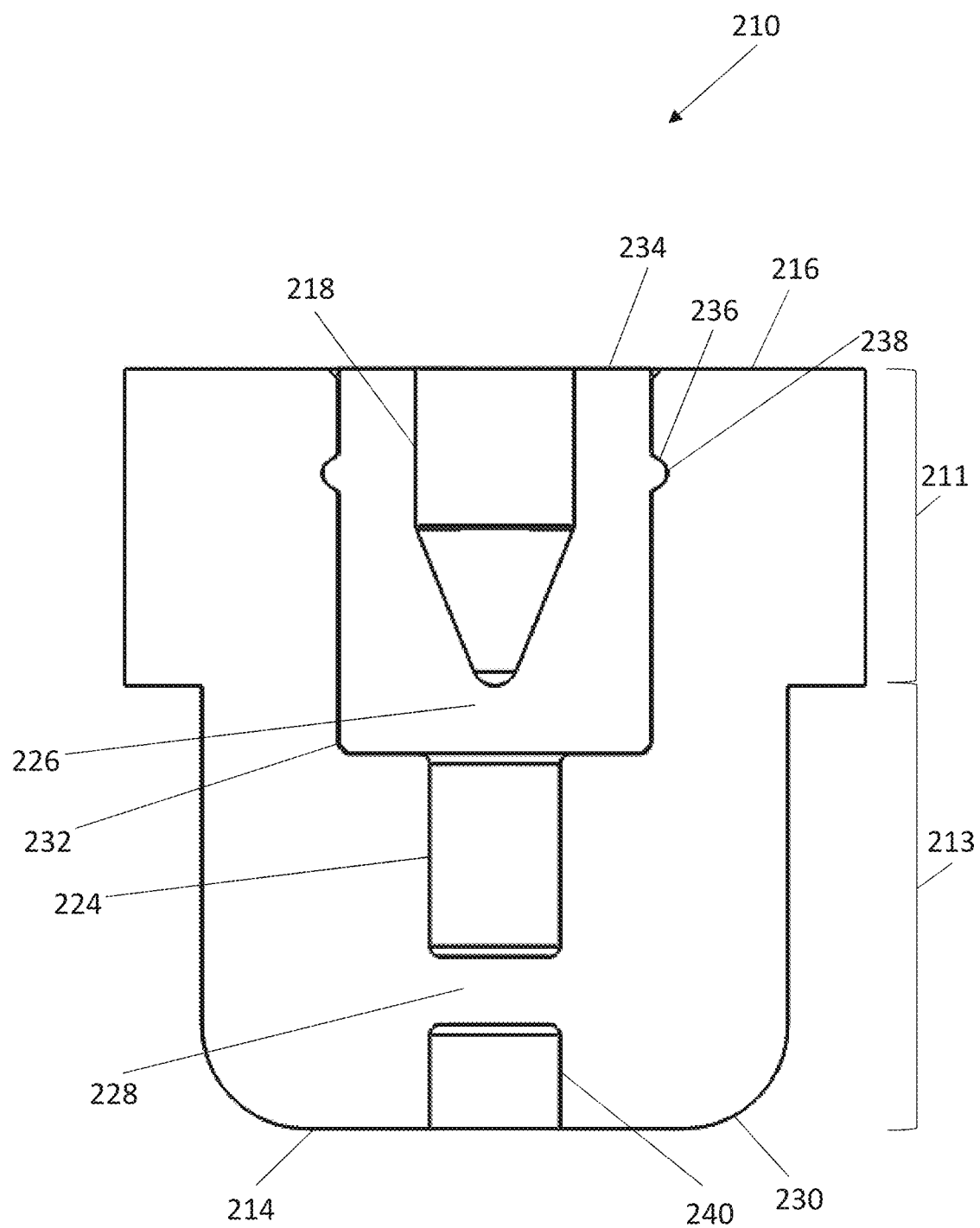
FIG. 3C depicts a cross-sectional view along line B-B of the second embodiment.

FIGS. 3A-3C depict a septum 210 according to a second embodiment of the present invention. In this second embodiment, the septum is "plug" design, generally cylindrical in shape with a larger diameter upper section 211 and a lower diameter lower section 213. The septum includes a top surface 216, a bottom surface 214 and a side extending 220 between the top surface 216 and the bottom surface 214. The upper section 211 has a diameter of about 7.10 mm and a thickness of about 3.04 mm. The lower section 213 has a diameter of about 5.62 mm and a thickness of about 4.25 mm. A central axis 212 extends vertically through the center of the septum 210. The top surface 216 includes an upper cylindrical cavity 218 centered on the central axis 212, which tapers to a point. This upper cavity 218 has a diameter of about 1.52 mm and a depth of about 3.04 mm. This upper cavity 218 serves to guide a needle inserted into the top surface 216 into passing along the central axis 212. The bottom surface 214 includes a lower cylindrical cavity 240 centered on the central axis 212. This lower cavity 240 has a diameter of about 1.25 mm and a depth of about 1.0 mm.

As shown in FIG. 3C, the septum 210 includes an internal chamber 224 spaced apart from the top surface 216, bottom surface 214, side 220, upper cavity 218, and lower cavity 240. In one embodiment, the chamber 224 has a diameter of about 1.25 mm and a height of about 1.95 mm. In other embodiments, the chamber 224 has a diameter in the range of about 1.0 mm to 2.0 mm. The portion of the septum 210 between the chamber 224 and the upper cavity 218 is referred to as the top seal 226 and has a thickness of about 0.65 mm. The portion of the septum 210 between the chamber 224 and the lower cavity 240 is referred to as the bottom seal 228 and has a thickness of about 0.65 mm. As should be readily understood, the preceding dimensions are provided for example purposes only and larger and smaller septa are envisioned.

In some embodiments, the septum 210 is formed in two parts for ease of manufacture. The larger second portion 230 includes a generally cylindrical-shaped recess 232 sized and shaped to receive the generally cylindrical-shaped first portion 234, the internal chamber 224 being formed between the first and second portions 234, 230. In the depicted embodiment, the first portion 234 includes a raised ridge 236 extending around the circumference of the first portion 234 and the second portion 230 includes a corresponding groove 238 extending around the circumference of the recess 232, such that the first portion 234 and second portion 230 engage each other via a tongue-and-groove fit. In alternative embodiments, the first portion 234 and second portion 230 may engage via a retaining ring, friction fit, an adhesive, chemical bonding, or other means known in the art.

Figure 4A:
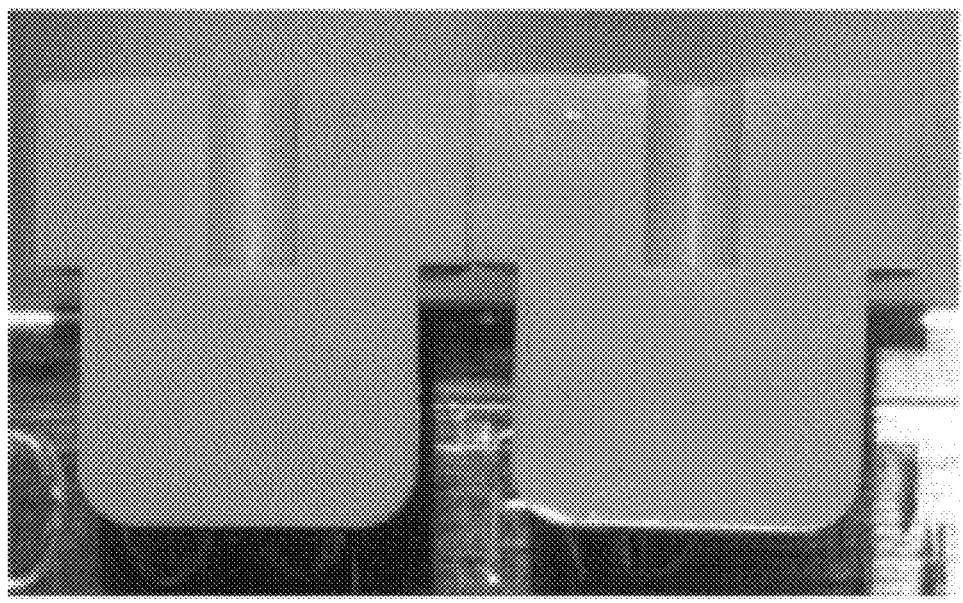
FIG. 4A depicts a cross-sectional view of a standard plug-shaped septum cut in half along its central axis.
Figure 4B:
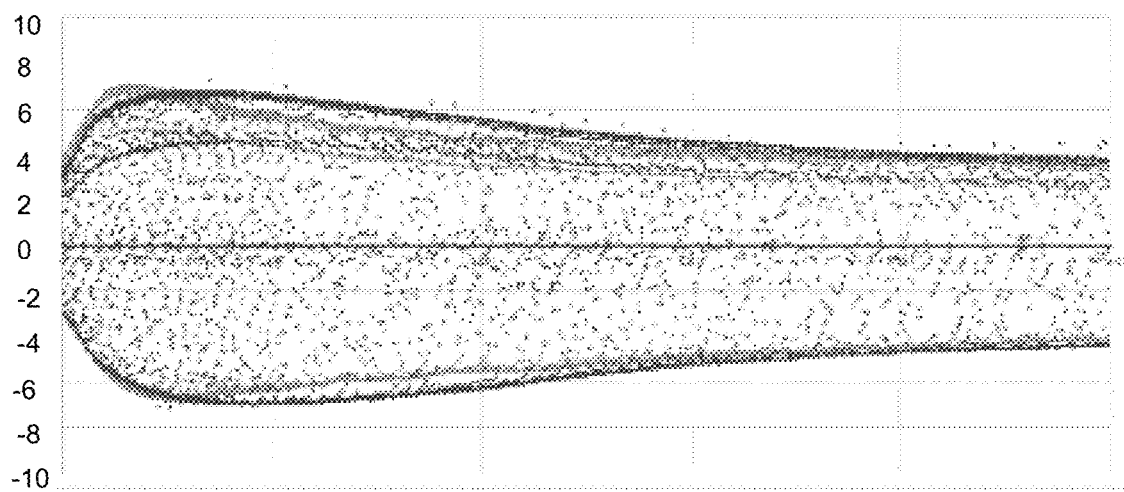
FIG. 4B is a plot of force (Y-axis) over time (X-axis) for insertion (positive force) and retraction (negative force) of a needle through a septum as shown in FIG. 4A over a duration of 2500 seconds (approximately 275 injection cycles).
Figure 5A:
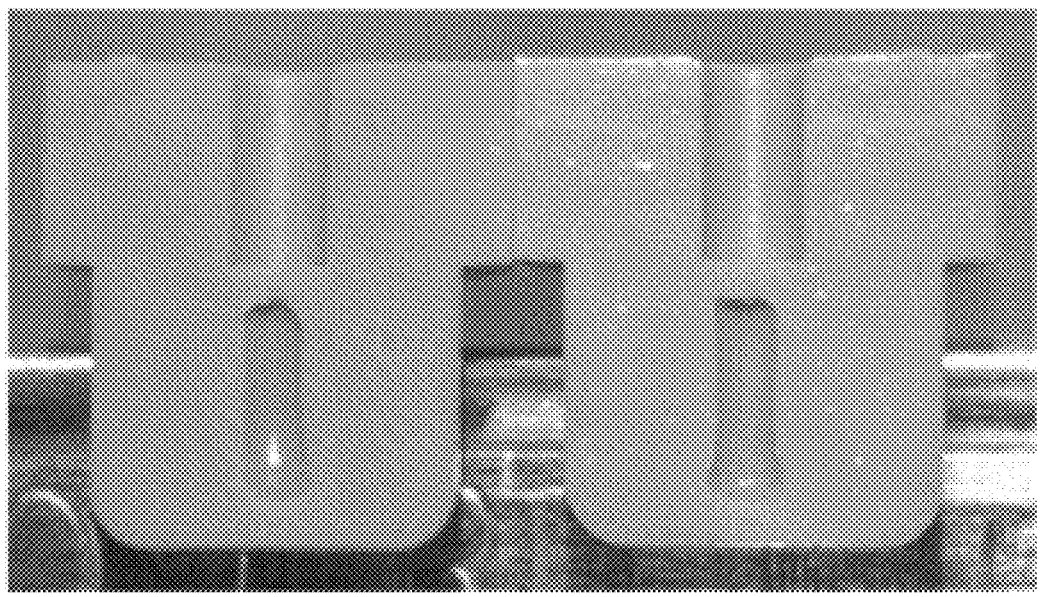
FIG. 5A depicts a cross-sectional view of a chambered plug-shaped septum cut in half along its central axis.
Figure 5B:
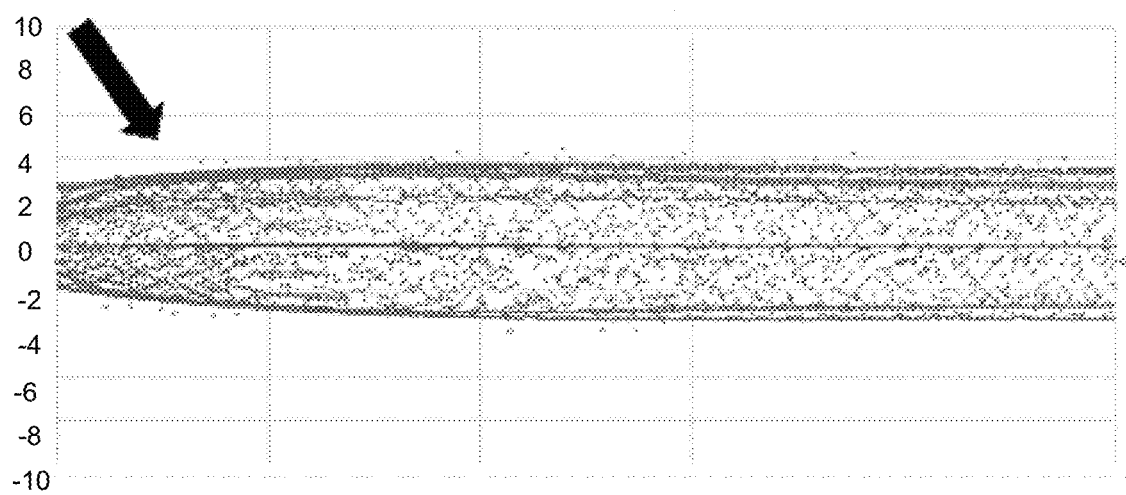
FIG. 5B is a plot of force (Y-axis) over time (X-axis) for insertion (positive force) and retraction (negative force) of a needle through a septum as shown in FIG. 5A over a duration of 2500 seconds (approximately 275 injection cycles).

Experimental evidence has shown that the chambered septa of the present invention impart reduced frictional force on needles as compared to standard, non-chambered septa. Referring now to FIGS. 4A and 5A, each drawing depicts a septum (standard in 4A, chambered in 5A) split along its central axis. The septa were reassembled and the force required to pierce each was recorded on a test stand which simulated approximately 275 needle piercing and retraction injection cycles over the course of 2500 seconds. The test stand is equipped with a force-measuring load cell which is connected to a computer for recording the force over many cycles. As shown in FIG. 4B, the standard septum requires a maximum force of over 7 N to complete an injection cycle, decreasing to approximately 4 N over time. In contrast, as shown in FIG. 5B, the chambered septum does not require more than 4 N to complete an injection cycle. This comparatively low insertion force allow for use of smaller gauge needles (e.g., 26 gauge instead of 23 gauge), which decreases the strain on septa during insertion and retraction.

26 gauge needles tend to bend when used with traditional solid-style septa as shown in FIG. 1. Furthermore, the low insertion force and decreased transit through solid septa material of the chambered septa reduces accumulation of septa material in the needle tip (also known as needle plugging), such accumulation resulting in an off-center spray pattern.

Figure 6A:
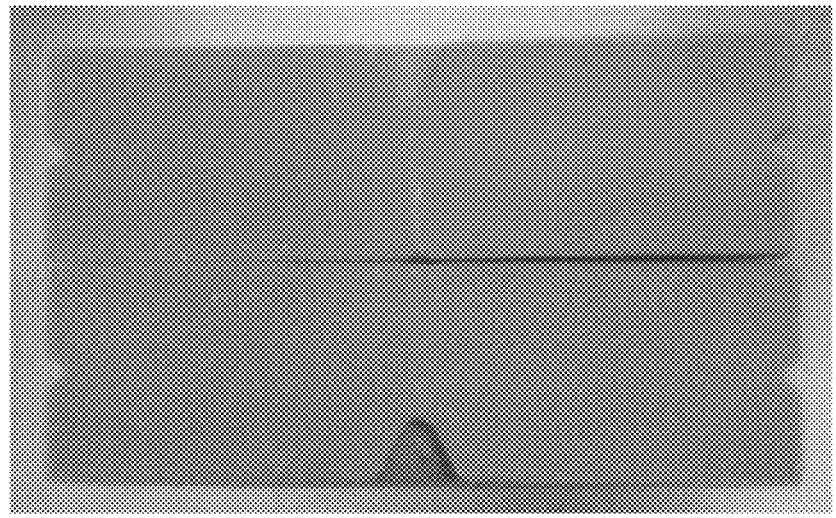
FIG. 6A depicts a cross-sectional view of a standard, pre-pierced disc-shaped septum cut in half along its central axis.
Figure 6B:
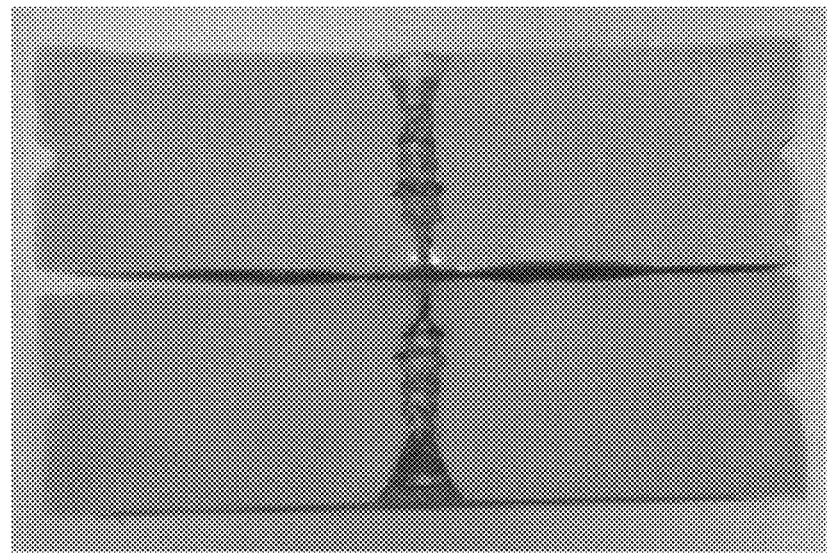
FIG. 6B depicts a cross-sectional view of a standard, pre-pierced disc-shaped septum cut in half along its central axis, after being subjected to 1000 injections.
Figure 7A:
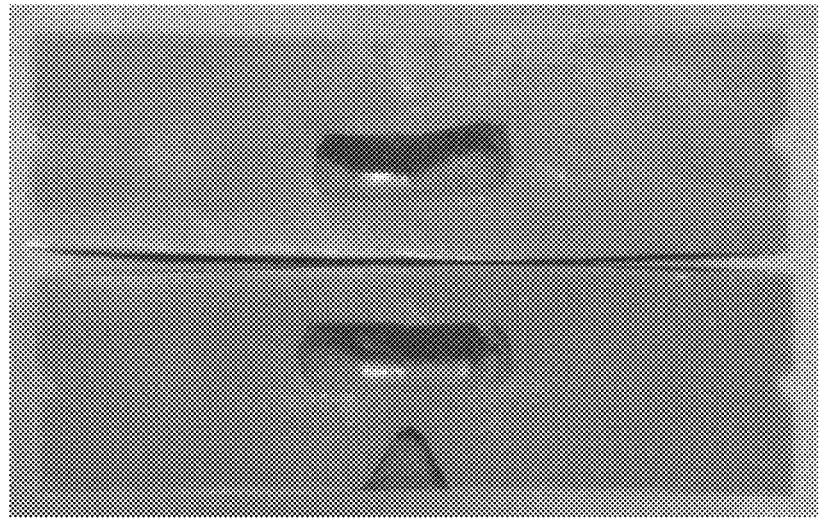
FIG. 7A depicts a cross-sectional view of a chambered disc-shaped septum cut in half along its central axis.
Figure 7B:
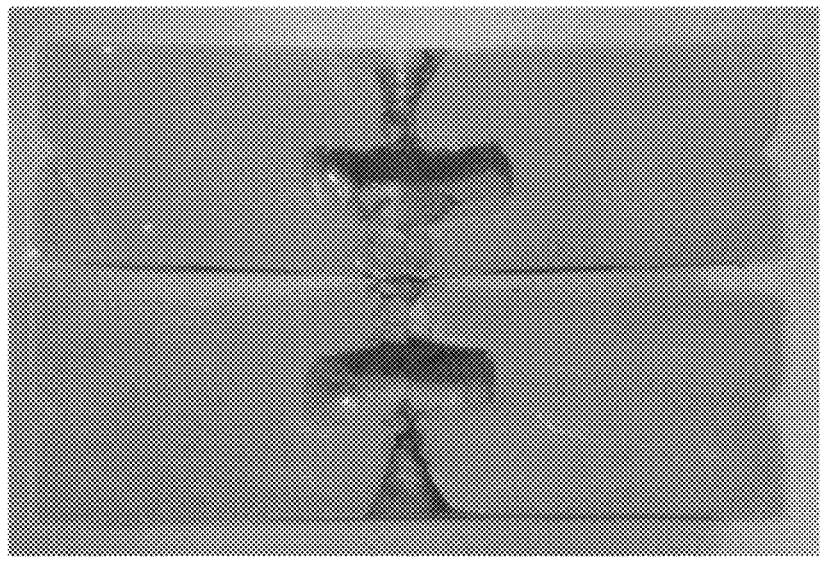
FIG. 7B depicts a cross-sectional view of a chambered disc-shaped septum cut in half along its central axis, after being subjected to 1000 injections.
Figure 8A:
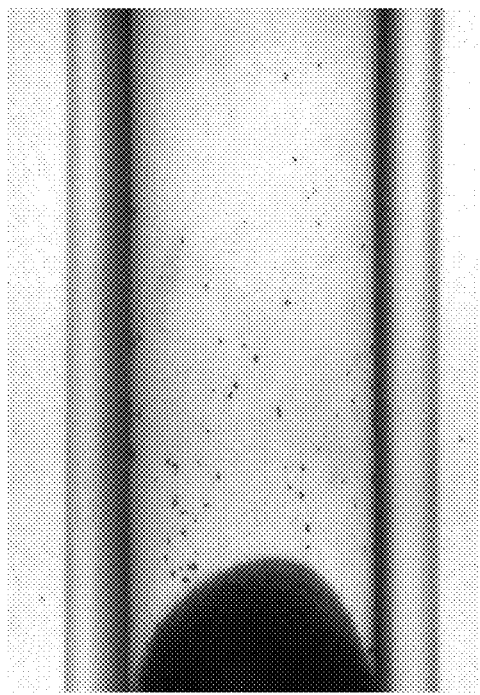
FIG. 8A is a photograph of a GC injection port liner after 1000 injections through the septum in FIG. 6B.
Figure 8B:
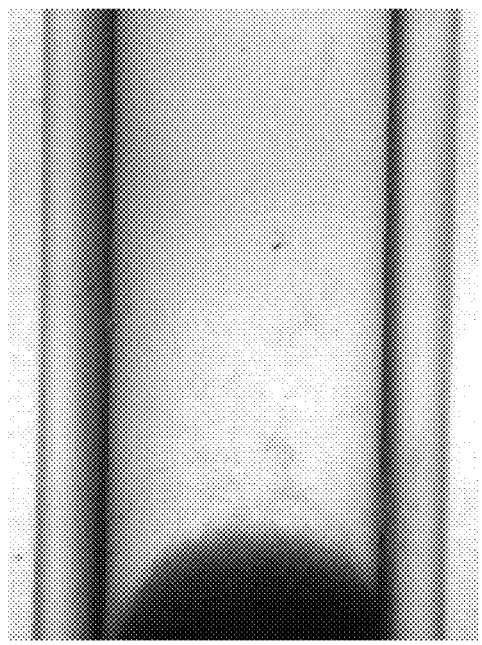
FIG. 8B is a photograph of a GC injection port liner after 1000 injections through the septum in FIG. 7B.

Experimental evidence has also shown that the chambered septa of the present invention produce less contaminating particulate matter as compared to standard, pre-pierced, non-chambered septa. FIGS. 6A and 6B display cross-sectional views of a pristine standard, pre-pierced, non-chambered septum, and a similar septum after 1000 injection cycles. FIG. 6B shows that significant septa material has been torn away along the central axis during use. FIG. 8A shows contaminating septum particulate matter in a GC liner after exposure to the 1000 injections in FIG. 6B. FIGS. 7A and 7B display cross-sectional views of a pristine chambered septum, and a similar septum after 1000 injection cycles. FIG. 7B shows that the bottom seal is worn, but no significant amounts of septa material have been torn away. FIG. 8B shows contaminating septum particulate matter in a GC liner after exposure to the 1000 injections in FIG. 7B. Comparing FIGS. 8A and 8B, the chambered septum produced negligible particulate matter after application of 1000 injection cycles, in contrast to the standard septum, which produced significant particulate matter.

Figure 9A:
FIG. 9A depicts a cross-sectional view of a standard, plug-shaped septum cut in half along its central axis.
Figure 9B:
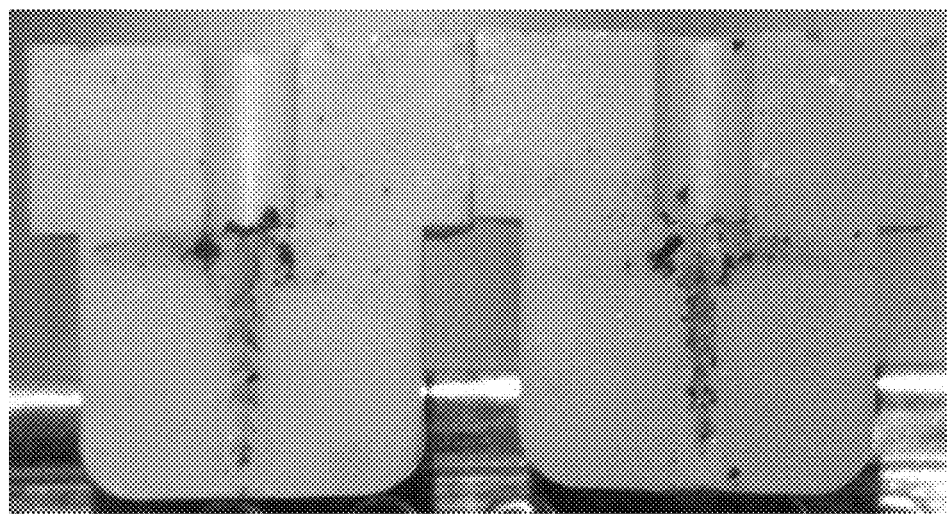
FIG. 9B depicts a cross-sectional view of a standard, plug-shaped septum cut in half along its central axis, after being subjected to 500 injections.
Figure 10A:
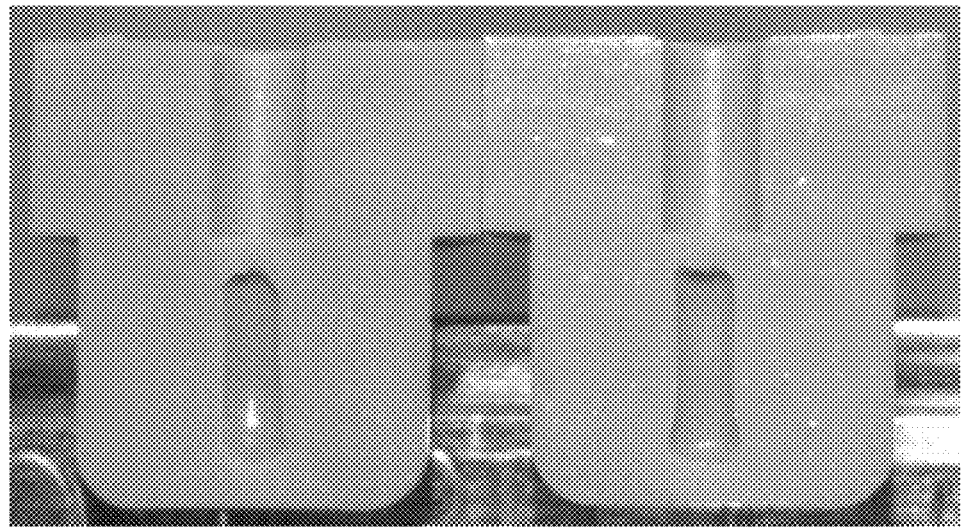
FIG. 10A depicts a cross-sectional view of a chambered plug-shaped septum cut in half along its central axis.
Figure 10B:
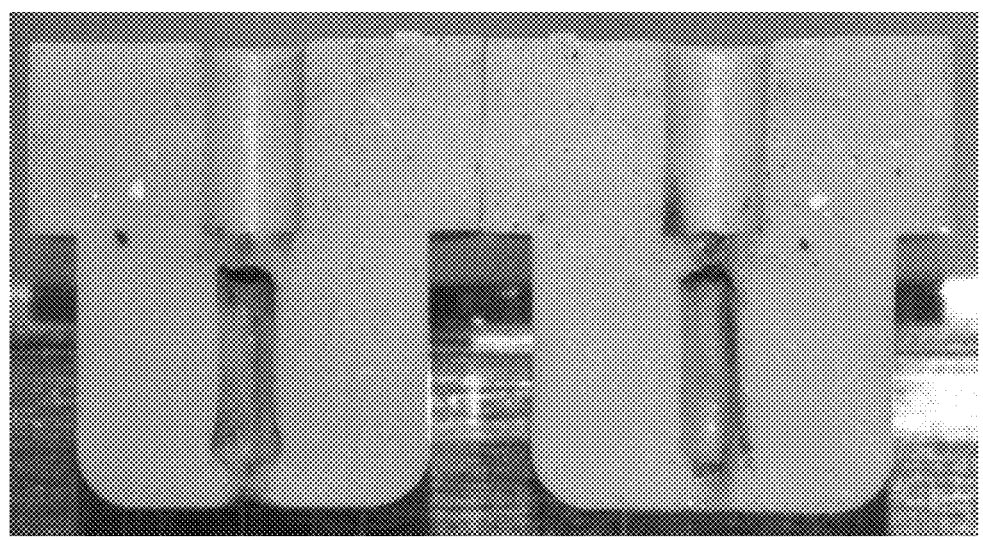
FIG. 10B depicts a cross-sectional view of a chambered plug-shaped septum cut in half along its central axis, after being subjected to 500 injections.
Figure 11A:
FIG. 11A is a photograph of a GC injection port liner after 500 injections through the septum in FIG. 9B.
Figure 11B:
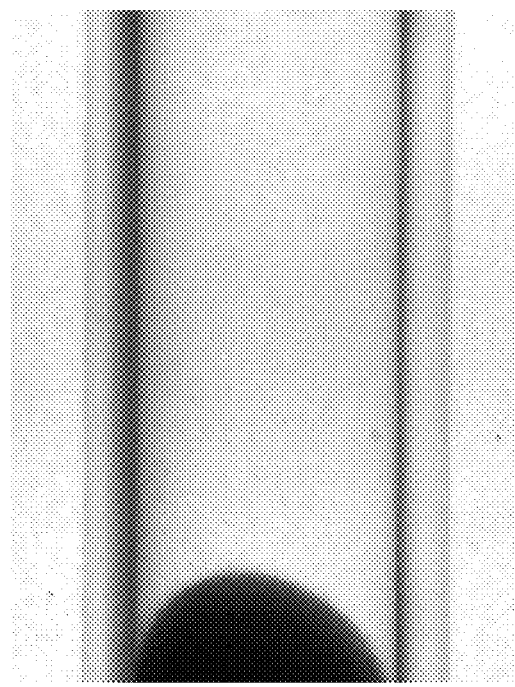
FIG. 11B is a photograph of a GC injection port liner after 500 injections through the septum in FIG. 10B.

FIGS. 9A and 9B display cross-sectional views of a pristine, standard, non-chambered, plug-type septum, and a similar septum after 500 injection cycles. FIG. 9B shows that significant septa material has been torn away along the central axis during use. FIG. 11A shows scattered contaminating septum particulate matter in a GC liner after exposure to 500 injection cycles through the septum shown in FIG. 9B. FIGS. 10A and 10B display cross-sectional views of a pristine, chambered, plug-type septum, and a similar septum after 500 injection cycles. FIG. 10B shows no significant damage to the upper and bottom seals, and no tearing of the septum. FIG. 11B shows contaminating septum particulate matter in a GC liner after exposure to 500 injection cycles through the septum shown in FIG. 10B. Comparing FIGS. 11A and 11B, the chambered plug-type septum produced substantially no contaminating particulate matter after application of 500 injection cycles, in contrast to the standard septum, which produced visible particulate matter.

Experimental evidence shows that chambered septa have a longer injection life (i.e., number of injections before leakage) than equivalent non-chambered septa. Without being bound by theory, it is postulated that the relatively thin upper and bottom seals can deform away from the needle more freely than a traditional septum in which substantially the entire thickness of the septum forms a seal. Also, there is a lower probability that particulate matter torn from the septum would lodge in the seal and prop it open. Furthermore, even if particulate matter lodged in the upper or bottom seal, the remaining seal is still capable of preventing leakage, providing a fail-safe not present in traditional septa.

In side-by-side tests of an 11 mm standard septum versus an 11 mm chambered septum, the chambered septum had longer effective life before failure (i.e., leaking), as shown in Table 1 below.

TABLE 1

Injection Life of Standard v. Chambered Septa - Conditions: 99 psi, inlet 275° C., ¾ turn past 1st contact, dual-gauge Gold syringe, injecting methanol. The leak rate is measured using both a flow meter which provides a leak rate in units of milliliters per minute, and an electronic leak detector which displays 0-7 lights as the leak rate increases.

| Septum/# | Leak rate (mL/min)/# lights | | | | | | | | | | | |
|---|---|---|---|---|---|---|---|---|---|---|---|---|
| Injections | 0 | 10 | 109 | 208 | 307 | 406 | 505 | 604 | 697/703 | 802 | 901 | 1000 |
| Standard | 0.0/0 | 0.0/0 | 0.0/0 | 0.0/0 | 0.0/0 | 0.0/0 | 0.0/0 | 0.0/0 | 10.8/7 | n/a | n/a | n/a |
| Chambered | 0.0/0 | 0.0/0 | 0.0/0 | 0.0/0 | 0.0/0 | 0.0/0 | 0.0/0 | 0.0/0 | 0.0/0 | 0.0/0 | 0.0/0 | 3.26/7 |

The standard septum failed after approximately 700 injections, while the chambered septum failed after approximately 1000 injections.

Figure 12A:
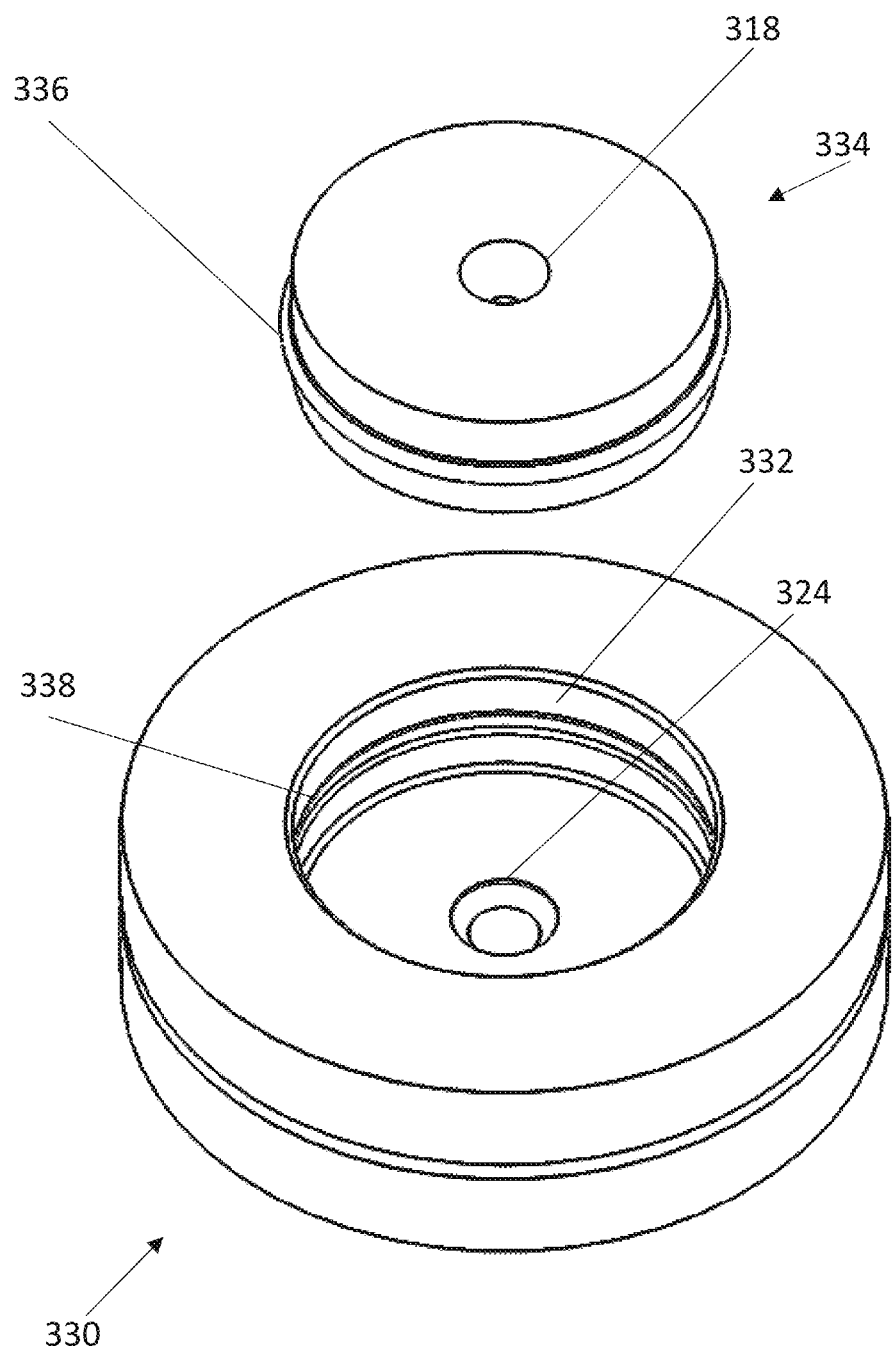
FIG. 12A depicts a perspective view of a third embodiment of a septum with the first portion and second portion of the septum in spaced apart relationship.
Figure 12B:
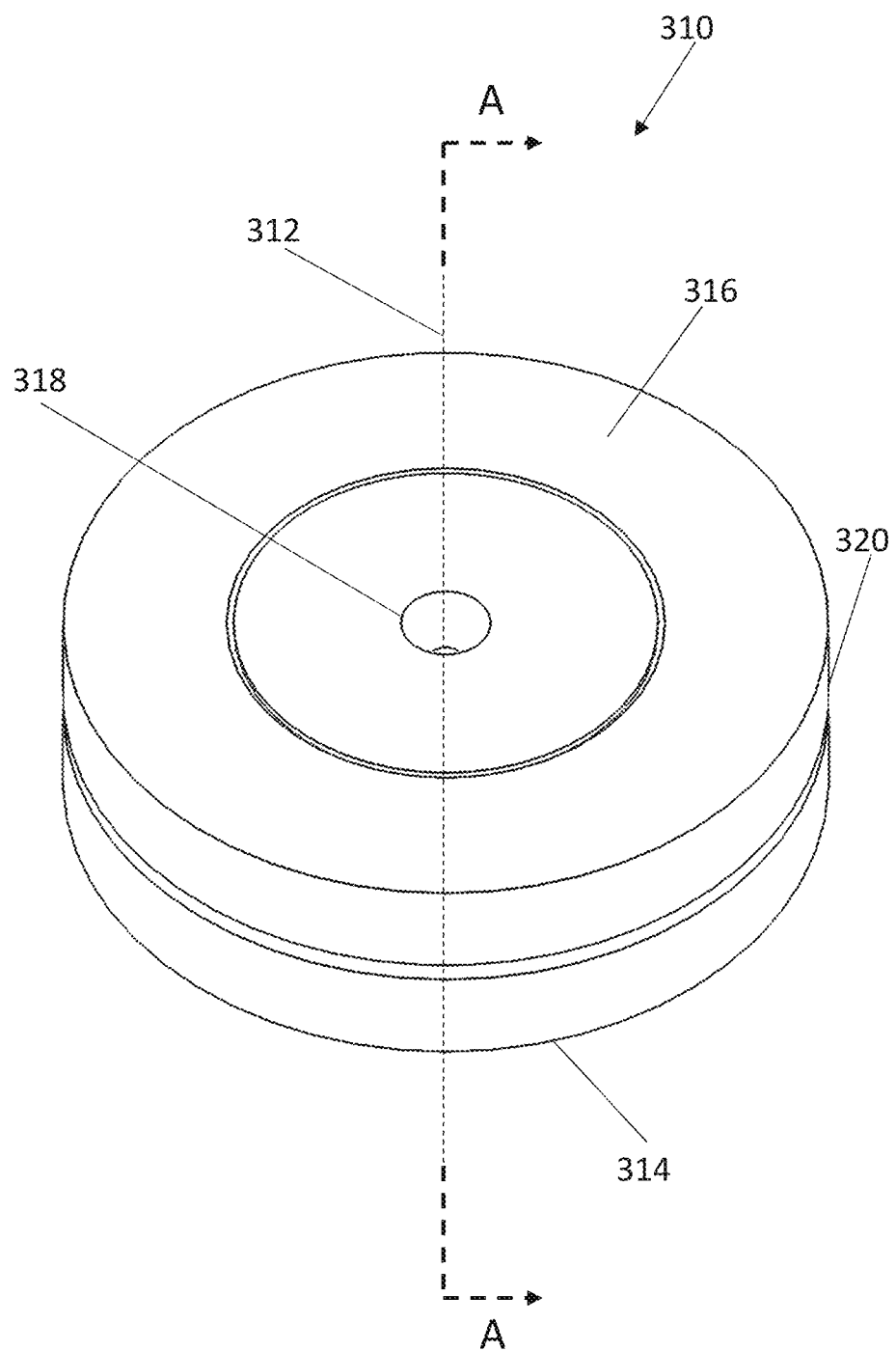
FIG. 12B depicts a perspective view of the third embodiment with the first portion installed within the second portion.
Figure 12C:
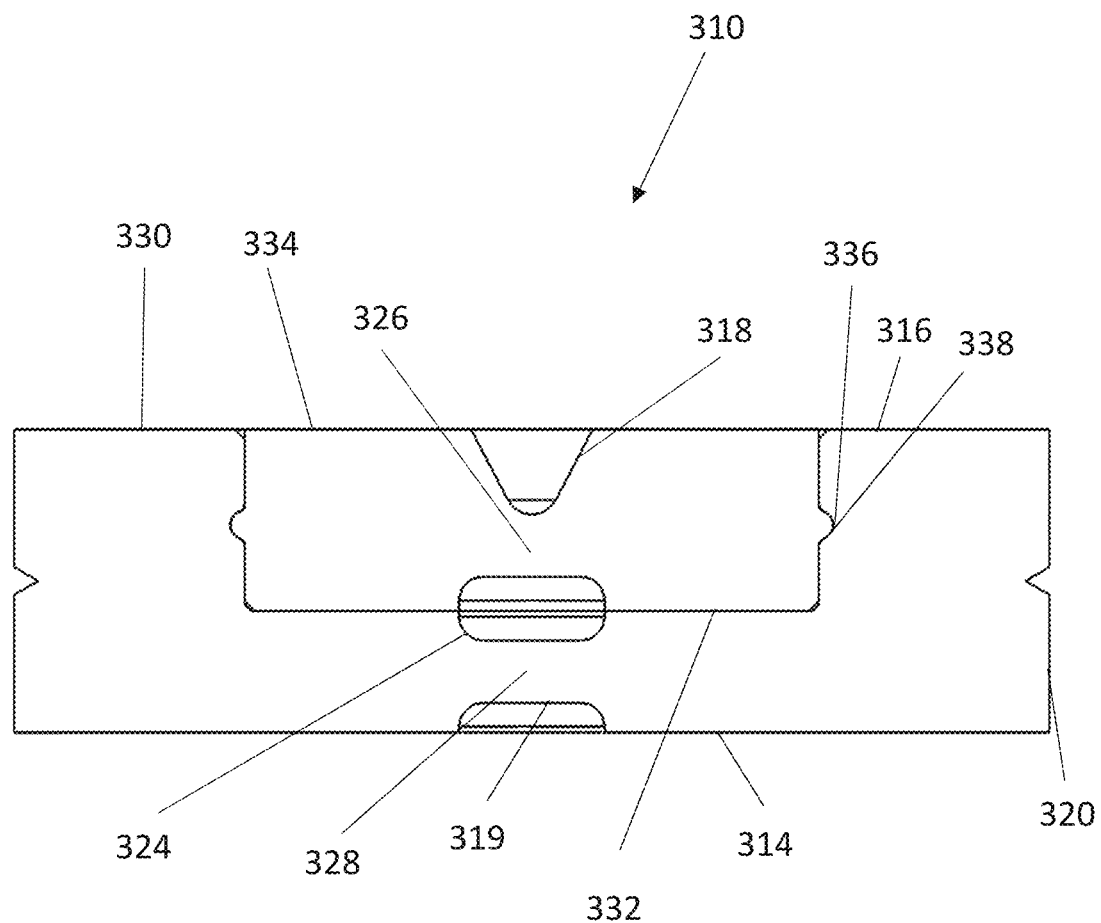
FIG. 12C depicts a cross-sectional view along line A-A of the third embodiment.

FIGS. 12A-12C depict a septum 310 according to a third embodiment of the present invention. In this third embodiment, the septum 310 is generally disc-shaped with a top surface 316, a bottom surface 314 and a side 320 extending between the top surface 316 and the bottom surface 314. The septum 310 has a diameter of about 10.82 mm and a thickness of about 3.17 mm. A central axis 312 extends vertically through the center of the septum 310. In this third embodiment, the top surface 316 includes a cone-shaped upper cavity 318 centered on the central axis 312, the upper cavity 318 having a depth of about 0.89 mm and a diameter of about 1.27 mm. This upper cavity 318 serves to guide a needle inserted into the top surface 316 into passing along the central axis 312. In this third embodiment, the bottom surface 314 includes a lower cavity 319 centered on the central axis 312. In some embodiments, the lower cavity 319 is generally circular in shape with a flat-bottom, having a depth of about 0.31 mm and a diameter in the range of about 1.0 mm to about 3.0 mm. In one embodiment, the diameter is about 1.25 mm.

As shown in FIG. 12C, the septum 310 includes an internal chamber 324 spaced apart from the top surface 316, bottom surface 314, side 320, upper cavity 318, and lower cavity 319. In some embodiments, the chamber 324 has a diameter in the range of about 1.0 mm to about 3.0 mm and a height of about 0.67 mm. The portion of the septum 310 between the chamber 324 and the lowest point of the cone-shaped upper cavity 318 is referred to as the top seal 326 and has a thickness of about 0.65 mm. The portion of the septum 310 between the chamber 324 and the lower cavity 319 is referred to as the bottom seal 328 and has a thickness of about 0.65 mm. As should be readily understood, the preceding dimensions are provided for example purposes only and larger and smaller septa are envisioned.

In some embodiments, the septum 310 is formed in two parts for ease of manufacture. The larger second portion 330 includes a generally cylindrical-shaped recess 332 sized and shaped to receive the generally cylindrical-shaped first portion 334, the internal chamber 324 being formed between the first and second portions 334, 330. In the depicted embodiment, the first portion 334 includes a raised ridge 336 extending around the circumference of the first portion 334 and the second portion 330 includes a corresponding groove 338 extending around the circumference of the recess 332, such that the first portion 334 and second portion 330 engage each other via a tongue-and-groove fit. In alternative embodiments, the first portion 334 and second portion 330 may engage via a retaining ring, friction fit, an adhesive, chemical bonding, or other means known in the art.

Figure 13A:
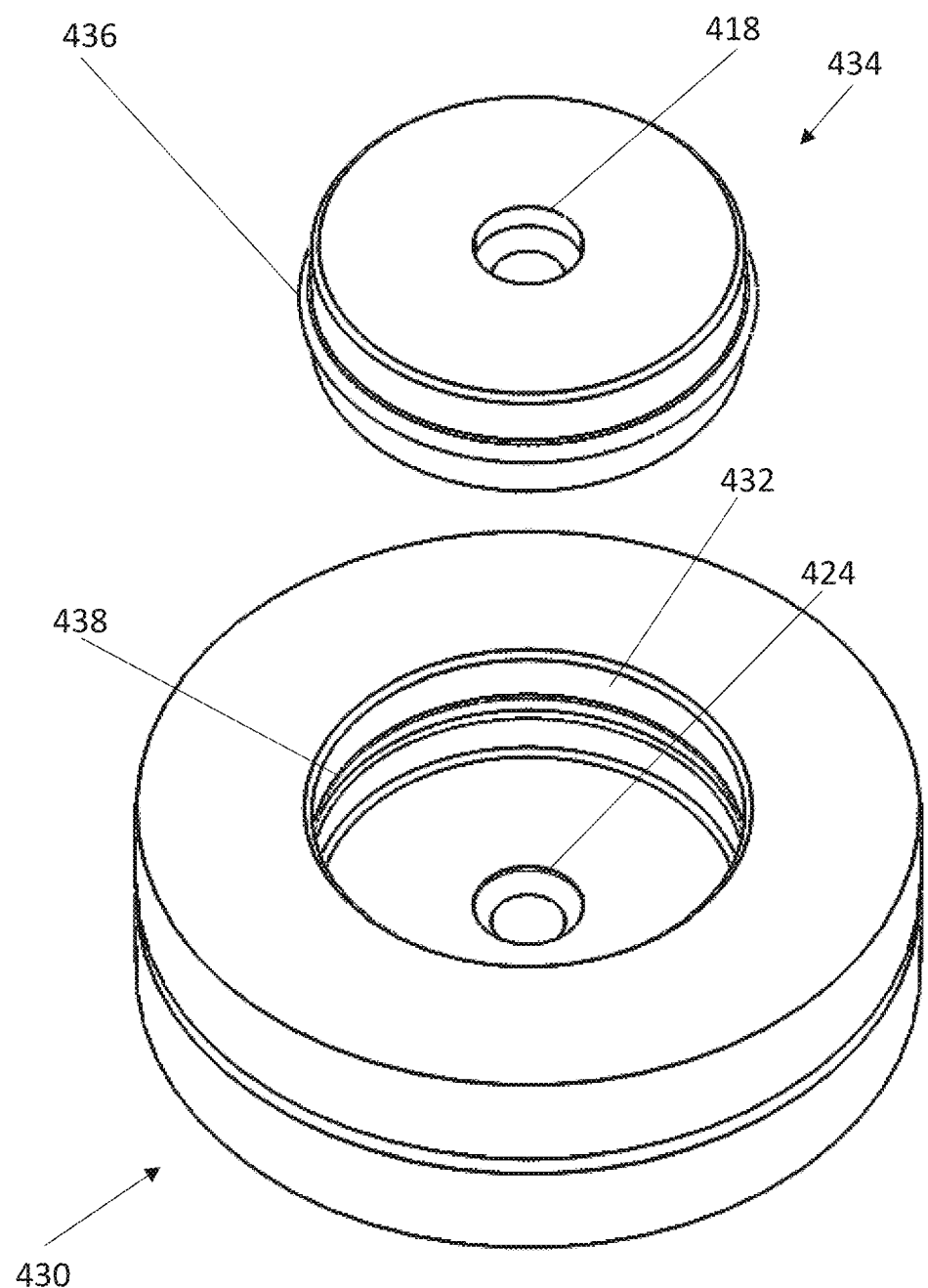
FIG. 13A depicts a perspective view of a fourth embodiment of a septum with the first portion and second portion of the septum in spaced apart relationship.
Figure 13B:
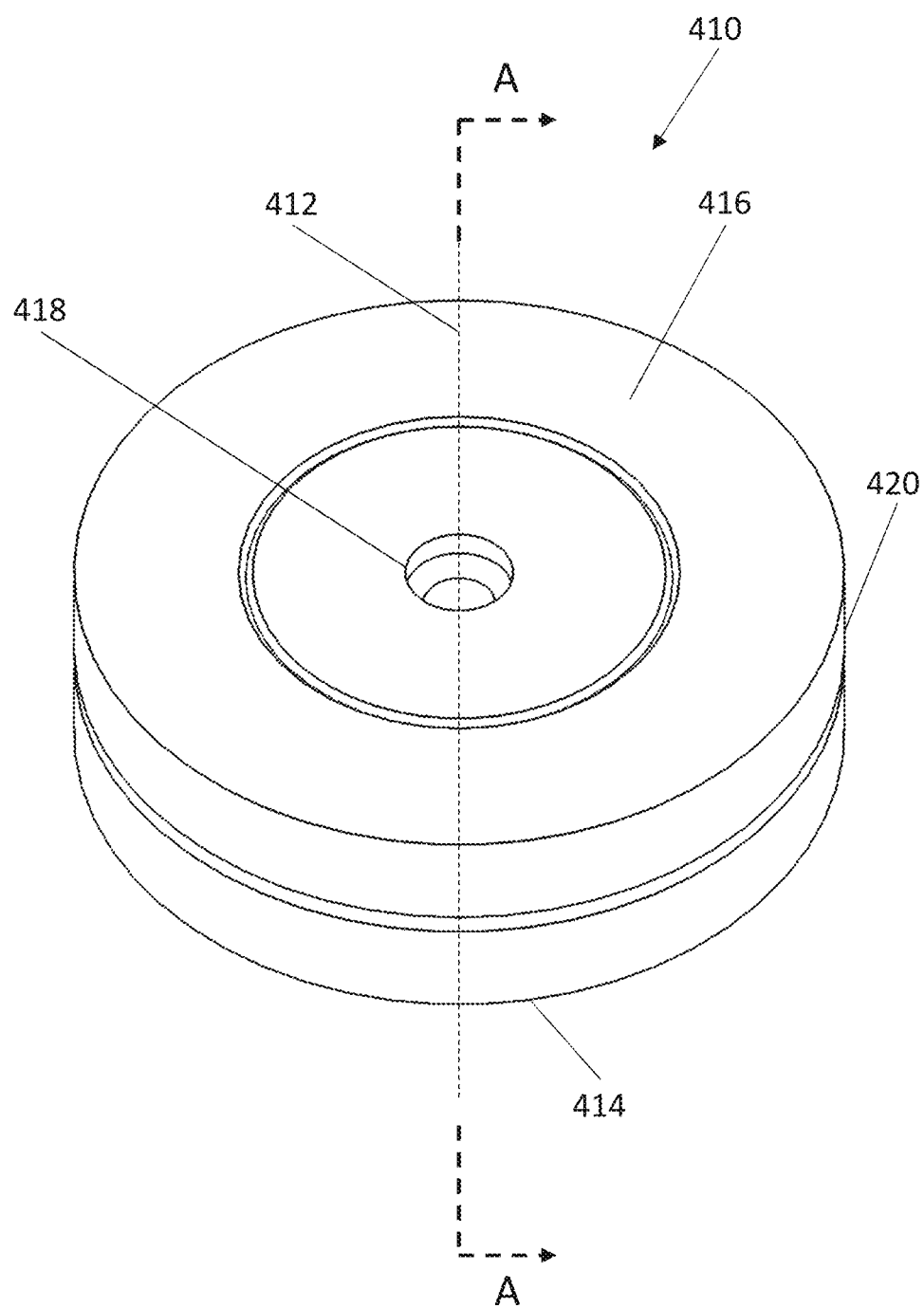
FIG. 13B depicts a perspective view of the fourth embodiment with the first portion installed within the second portion.
Figure 13C:
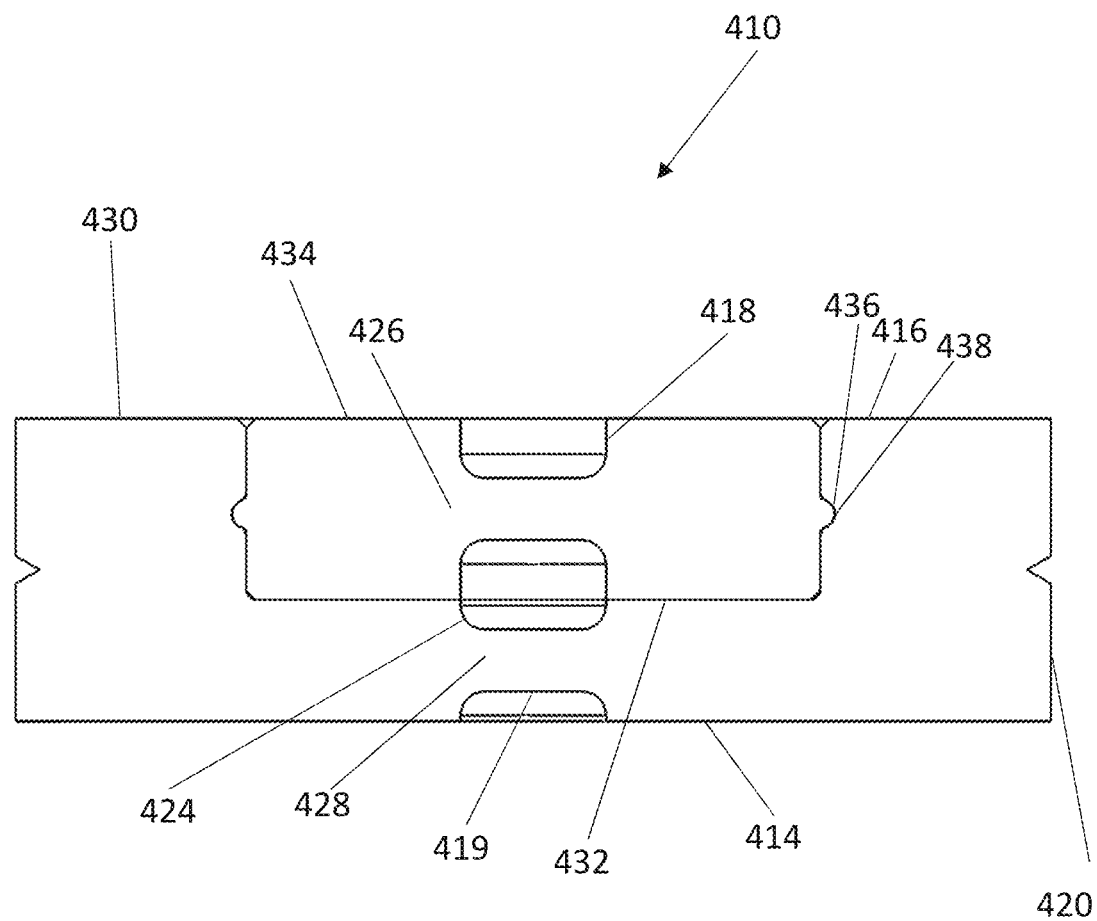
FIG. 13C depicts a cross-sectional view along line A-A of the fourth embodiment.

FIGS. 13A-13C depict a septum 410 according to a fourth embodiment of the present invention. In this fourth embodiment, the septum 410 is generally disc-shaped with a top surface 416, a bottom surface 414 and a side 420 extending between the top surface 416 and the bottom surface 414. The septum 410 has a diameter of about 10.82 mm and a thickness of about 3.17 mm. A central axis 412 extends vertically through the center of the septum 410. In this fourth embodiment, the top surface 416 includes a flat-bottomed upper cavity 418 centered on the central axis 412, the upper cavity 418 having a depth of about 0.62 mm and a diameter in the range of about 1.0 mm to 3.0 mm. This upper cavity 418 serves to guide a needle inserted into the top surface 416 into passing along the central axis 412. In this fourth embodiment, the bottom surface 416 includes a lower cavity 419 centered on the central axis 412. In some embodiments, the lower cavity 419 is generally circular in shape with a flat-bottom, having a depth of about 0.31 mm and a diameter in the range of about 1.0 mm to about 3.0 mm. In one embodiment, the diameter is about 1.25 mm.

Without being bound by theory, this flat-bottom design of upper cavity 418 reduces surface area contact between septum 410 and needle and applies more uniform stresses to the septum 410 as the needle is inserted and retracted, as compared to the cone-shaped, chamfered design of upper cavity 318. However, both designs have their advantages, as the cone-shaped, chamfered design may be more precise in guiding the needle along the central axis 312.

As shown in FIG. 13C, the septum 410 includes an internal chamber 424 spaced apart from the top surface 416, bottom surface 414, side 420, upper cavity 418, and lower cavity 419. In some embodiments, the chamber 424 has a diameter in the range of about 1.0 mm to about 3.0 mm and a height of about 1.24 mm. The portion of the septum 410 between the chamber 424 and the upper cavity 418 is referred to as the top seal 426 and has a thickness of about 0.65 mm. The portion of the septum 410 between the chamber 424 and the lower cavity 419 is referred to as the bottom seal 428 and has a thickness of about 0.65 mm. As should be readily understood, the preceding dimensions are provided for example purposes only and larger and smaller septa are envisioned.

This fourth embodiment septum 410 is generally similar to the third embodiment septum 310 apart from the upper cavity 418 and chamber 424. The upper cavity 418 has a decreased depth as compared to upper cavity 318, and each have a similar thickness of the top seal 328, 428, resulting in chamber 424 having a greater height than chamber 324.

In some embodiments, the septum 410 is formed in two parts for ease of manufacture. The larger second portion 430 includes a generally cylindrical-shaped recess 432 sized and shaped to receive the generally cylindrical-shaped first portion 434, the internal chamber 424 being formed between the first and second portions 434, 430. In the depicted embodiment, the first portion 434 includes a raised ridge 436 extending around the circumference of the first portion 434 and the second portion 430 includes a corresponding groove 438 extending around the circumference of the recess 432, such that the first portion 434 and second portion 430 engage each other via a tongue-and-groove fit. In alternative embodiments, the first portion 434 and second portion 430 may engage via a retaining ring, friction fit, an adhesive, chemical bonding, or other means known in the art.

Figure 14A:
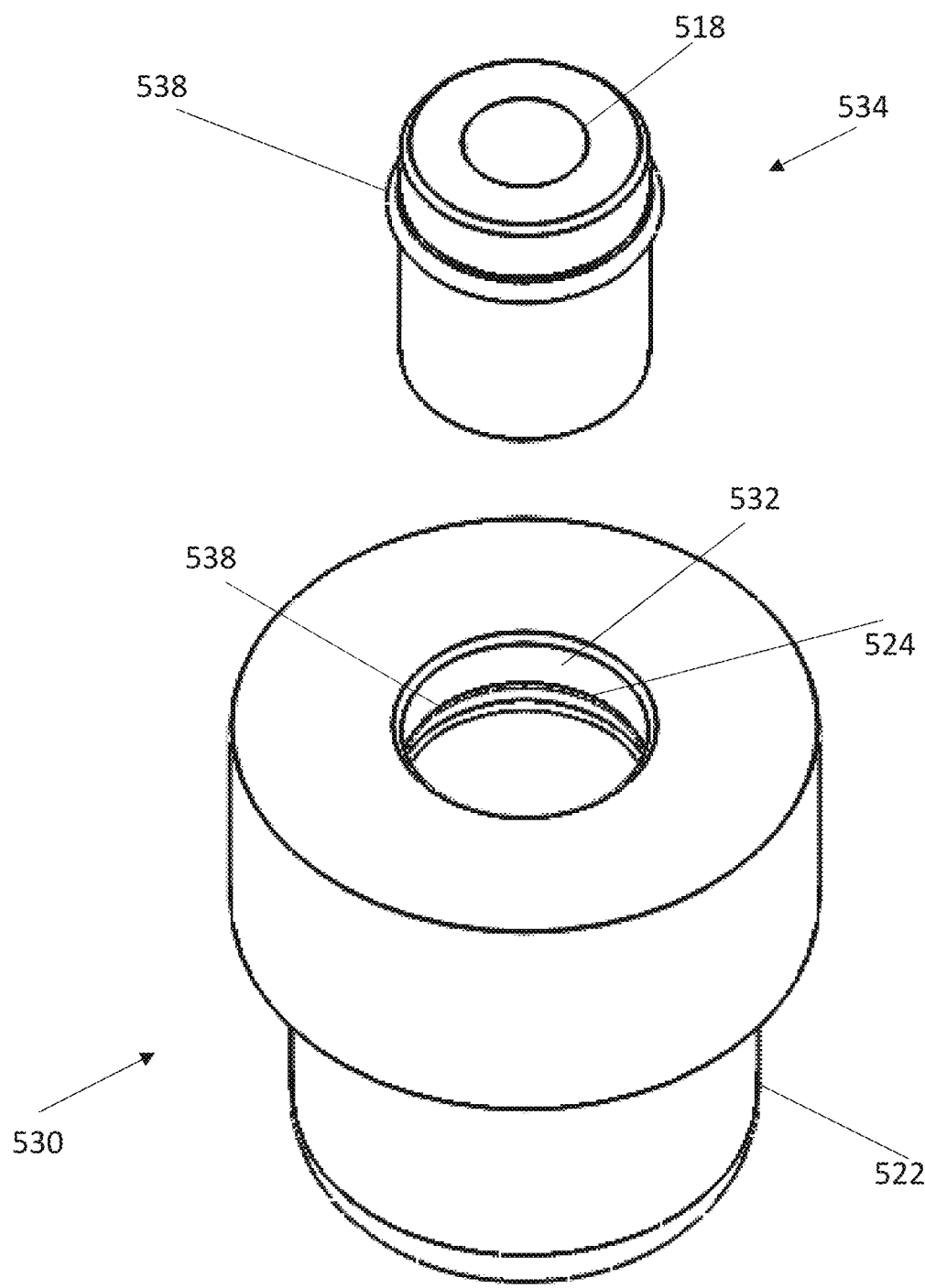
FIG. 14A depicts a perspective view of a fifth embodiment of a septum with the first portion and second portion of the septum in spaced apart relationship.
Figure 14B:
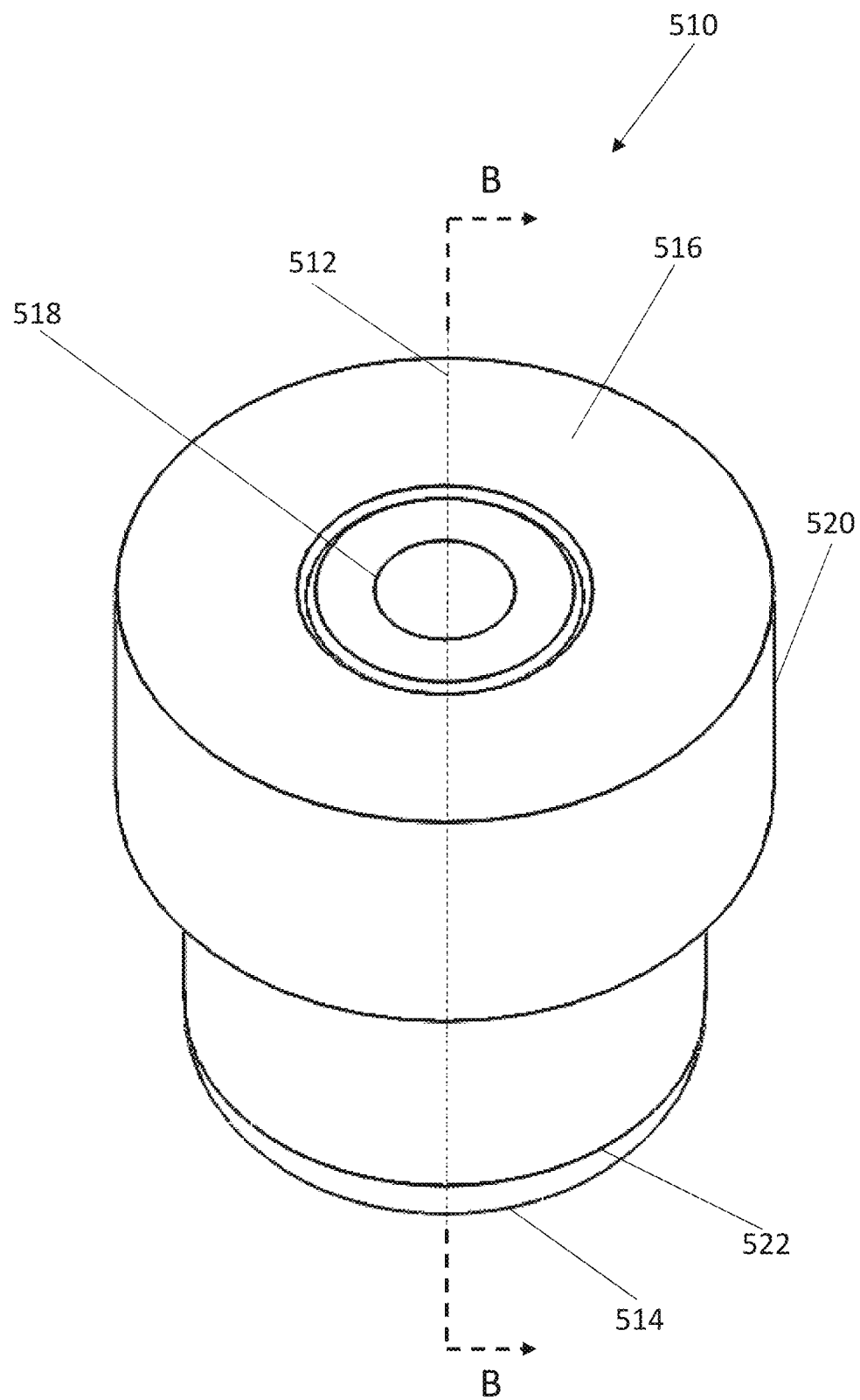
FIG. 14B depicts a perspective view of the fifth embodiment with the first portion installed within the second portion.
Figure 14C:
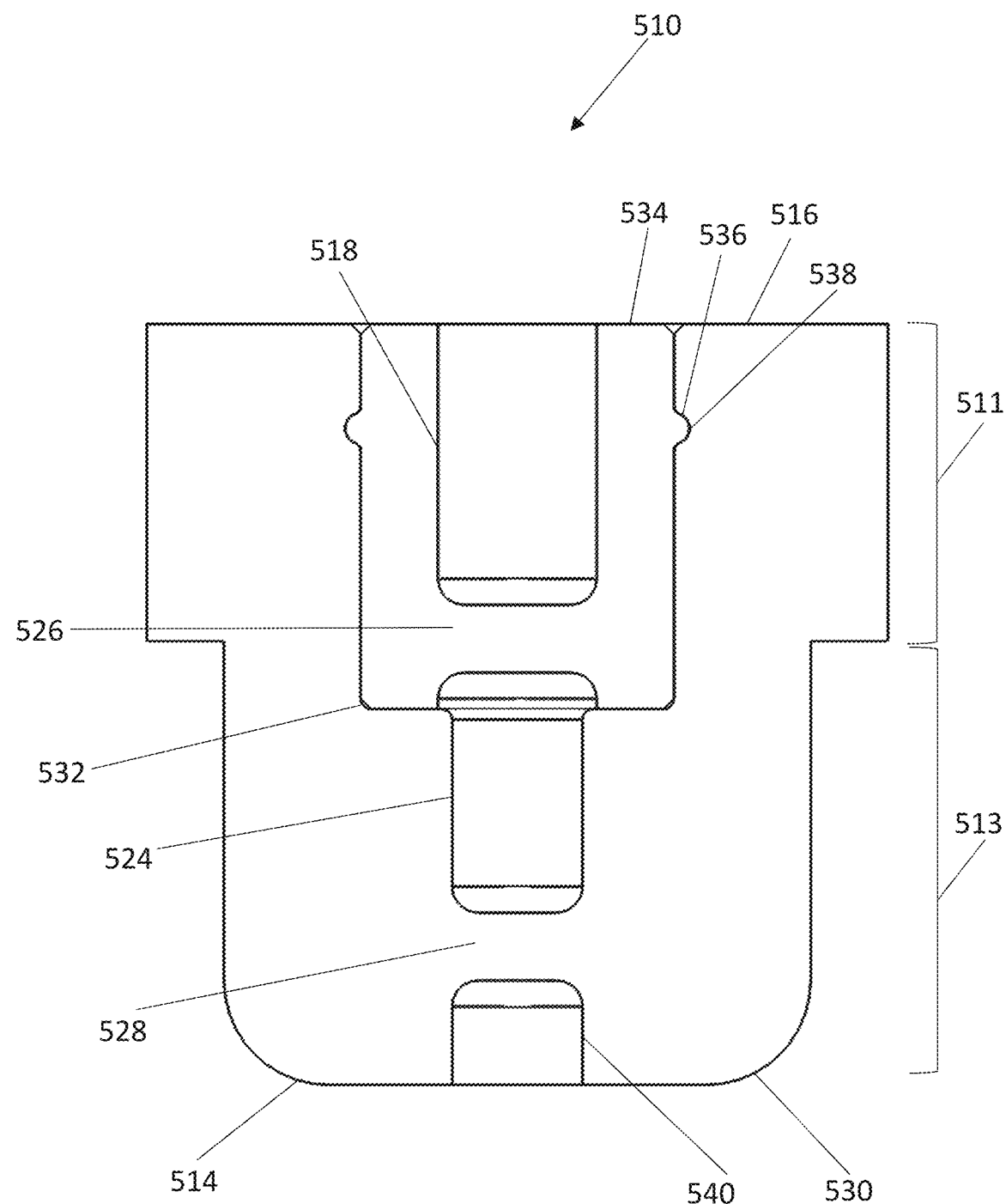
FIG. 14C depicts a cross-sectional view along line A-A of the fifth embodiment.

FIGS. 14A-14C depict a septum 510 according to a fifth embodiment of the present invention. In this fifth embodiment, the septum is "plug" design, generally cylindrical in shape with a larger diameter upper section 511 and a lower diameter lower section 513. The septum includes a top surface 516, a bottom surface 514 and a side 520 extending between the top surface 516 and the bottom surface 514. The upper section 511 has a diameter of about 7.10 mm and a thickness of about 3.04 mm. The lower section 513 has a diameter of about 5.62 mm and a thickness of about 4.25 mm. A central axis 512 extends vertically through the center of the septum 510. The top surface 516 includes a cylindrical upper cavity 518 centered on the central axis 512. While the upper cavity 218 in the second embodiment septum 210 tapers to a point, the upper cavity 518 in this fifth embodiment has a substantially flat bottom. This upper cavity 518 has a diameter of about 1.52 mm and a depth in the range of about 1.5 mm to 2.7 mm. This cavity 518 serves to guide a needle inserted into the top surface 516 into passing along the central axis 512. The bottom surface 514 includes a cylindrical lower cavity 540 centered on the central axis 512. This lower cavity 540 has a diameter of about 1.25 mm and a depth of about 1.0 mm.

As shown in FIG. 14C, the septum 510 includes an internal chamber 524 spaced apart from the top surface 516, bottom surface 514, side 520, upper cavity 518, and lower cavity 540. In one embodiment, the chamber 524 is generally mushroom-shaped, having a diameter of about 1.52 mm in its upper portion and a diameter of about 1.25 mm in its lower portion. The chamber 524 has a height in the range of 2.0 mm to 3.5 mm, and in the depicted embodiment, a height of about 2.075 mm. The portion of the septum 510 between the chamber 524 and the upper cavity 518 is referred to as the top seal 526 and has a thickness of about 0.65 mm. The portion of the septum 510 between the chamber 524 and the lower cavity 540 is referred to as the bottom seal 528 and has a thickness of about 0.65 mm. As should be readily understood, the preceding dimensions are provided for example purposes only and larger and smaller septa are envisioned.

In some embodiments, the septum 510 is formed in two parts for ease of manufacture. The larger second portion 530 includes a generally cylindrical-shaped recess 532 sized and shaped to receive the generally cylindrical-shaped first portion 534, the internal chamber 524 being formed between the first and second portions 534, 530. In the depicted embodiment, the first portion 534 includes a raised ridge 536 extending around the circumference of the first portion 534. The second portion 530 includes a corresponding groove 538 extending around the circumference of the recess 532, such that the first portion 534 and second portion 530 engage each other via a tongue-and-groove fit. In alternative embodiments, the first portion 534 and second portion 530 may engage via a retaining ring, friction fit, an adhesive, chemical bonding, or other means known in the art.

In further embodiments (not shown), the chambered septa of the present invention may include more than one internal chamber. In such embodiments, the septa would include a top seal between the top surface and the first chamber, an intermediate seal between the first chamber and second chamber, and a bottom seal between the second chamber and the bottom surface. Embodiments with three or more chambers are also contemplated.

In further embodiments, the chambered septa of the present invention may be formed of a single, resilient elastomeric material or a combination or mixture of materials. In some embodiments, the first portion may be made of a first elastomeric material and the second portion may be made of a second elastomeric material. The first and second elastomeric materials may have different mechanical properties, such as the first elastomeric material having a first hardness and the second elastomeric material having a second hardness, wherein the first hardness and second hardness are not identical. In certain embodiments, the first portion and second portion may be made of the same elastomeric material, but with different additives to provide different mechanical properties.

In further embodiments, including any of the first through fifth embodiments described above, chambered septa may optionally be pre-pierced along the central axis.

Various aspects of different embodiments of the present disclosure are expressed in paragraphs X1 and X2 as follows:

X1. One embodiment of the present disclosure includes a septum including a body formed of resilient, elastomeric material, the body having a top surface, a bottom surface, and at least one side extending between the top surface and the bottom surface, the body including a central axis; and at least one internal chamber within the body, the central axis extending through the chamber.

X2. Another embodiment of the present disclosure includes a method of using a chambered septum, including providing a septum having a body formed of resilient, elastomeric material, the body having a top surface, a bottom surface, at least one side extending between the top surface and the bottom surface, at least one internal chamber within the body, a top seal between the at least one chamber and the top surface, a bottom seal between the at least one chamber and the bottom surface, and a central axis extending through the chamber; inserting the bottom surface into a gas chromatography injection port; and inserting a needle along the central axis serially through the top seal, the internal chamber, and the bottom seal.

Yet other embodiments include the features described in any of the previous paragraphs X1 or X2, as combined with one or more of the following aspects:

Wherein the septum includes a top seal between the at least one chamber and the top surface, and a bottom seal between the at least one chamber and the bottom surface.

Wherein the top seal has a thickness between about 0.1 mm and about 2 mm.

Wherein the top seal has a thickness between about 0.3 mm and about 1.2 mm.

Wherein the top seal has a thickness of about 0.65 mm.

Wherein the bottom seal has a thickness between about 0.1 mm and about 2 mm.

Wherein the bottom seal has a thickness between about 0.3 mm and about 1.2 mm.

Wherein the bottom seal has a thickness of about 0.65 mm.

Wherein the chamber has a diameter between 0.06 mm and 13 mm.

Wherein the chamber has a diameter between 0.10 mm and 6.5 mm.

Wherein the body includes a first portion and a second portion, the second portion including a recess sized and shaped to receive at least a portion of the first portion.

Wherein the first portion is cylindrically-shaped and wherein the recess is sized and shaped to receive at least a portion of the cylindrically-shaped first portion.

Wherein the first portion and the recess engage via a tongue-and-groove fit.

Wherein the chamber is formed between the first portion and the second portion.

Wherein the chamber is cylindrically-shaped.

Wherein the chamber is mushroom-shaped.

Wherein the chamber is a hollow chamber.

Wherein the first portion is formed of a first elastomeric material, wherein the second portion is formed of a second elastomeric material, and wherein the first elastomeric material and second elastomeric material have different mechanical properties.

Wherein the first elastomeric material and the second elastomeric material have different hardness values.

Wherein the septum includes an upper cavity formed in the top surface.

Wherein the septum includes a lower cavity formed in the bottom surface.

Wherein the upper cavity is cone-shaped.

Wherein the upper cavity is flat-bottomed.

Wherein the lower cavity is cone-shaped.

Wherein the lower cavity is flat-bottomed.

Wherein the septum includes an upper cavity formed in the top surface and a lower cavity formed in the bottom surface, the central axis extending serially through the upper cavity, the chamber, and the lower cavity.

Wherein the septum is pre-pierced along the central axis.

Wherein the top surface includes an upper cavity; wherein the central axis extends through the upper cavity; and wherein the step of inserting the needle comprises inserting the needle along the central axis serially through the upper cavity, the top seal, the internal chamber, and the bottom seal.

Wherein the bottom surface includes a lower cavity; wherein the central axis extends through the lower cavity; and wherein the step of inserting the needle comprises inserting the needle along the central axis serially through the top seal, the internal chamber, the bottom seal, and the lower cavity.

Wherein the top surface includes an upper cavity; wherein the bottom surface includes a lower cavity; wherein the central axis extends through the upper cavity and the lower cavity; and wherein the step of inserting the needle comprises inserting the needle along the central axis serially through the upper cavity, the top seal, the internal chamber, the bottom seal, and the lower cavity.

Wherein the method further includes retracting the needle subsequent to the inserting.

Wherein the step of retracting the needle comprises retracting the needle along the central axis serially through the bottom seal, the internal chamber, and the top seal.

Wherein not more than 4 N of force is required for said inserting the needle and said retracting the needle.

Wherein not more than 4 N of force is required for said inserting the needle.

The foregoing detailed description is given primarily for clearness of understanding and no unnecessary limitations are to be understood therefrom, for modifications can be made by those skilled in the art upon reading this disclosure and may be made without departing from the spirit of the invention. Although specific spatial dimensions are stated herein, such specific quantities are presented as examples only. Reference systems, if used herein, refer generally to various directions (for example, top, bottom, upper, lower, forward, rearward, left, right, etc.), which are merely offered to assist the reader in understanding the various embodiments of the disclosure and are not to be interpreted as limiting. Other reference systems may be used to describe various embodiments.

What is claimed is:

1. A septum comprising:
a body formed of resilient, elastomeric material, the body having a top surface, a bottom surface, and at least one side extending between the top surface and the bottom surface, the body including
a central axis,
at least one internal chamber within the body, the central axis extending through the chamber, wherein the chamber is configured to reduce strain on a needle inserted or retracted therethrough,
an elastomeric top membrane seal between the at least one chamber and the top surface, and
an elastomeric bottom membrane seal between the at least one chamber and the bottom surface;
wherein both the top seal and bottom seal, with or without a needle inserted therethrough, substantially isolate the at least one chamber from an outside environment.

2. The septum of claim 1, wherein the top seal has a thickness between about 0.1 mm and about 2 mm, and wherein the bottom seal has a thickness between about 0.1 mm and about 2 mm.

3. The septum of claim 1, wherein the chamber has a diameter between about 0.06 mm and 13 mm.

4. The septum of claim 1, further comprising an upper cavity formed in the top surface.

5. The septum of claim 1, further comprising a lower cavity formed in the bottom surface.

6. The septum of claim 1, further comprising an upper cavity formed in the top surface and a lower cavity formed in the bottom surface, the central axis extending serially through the upper cavity, the chamber, and the lower cavity.

7. The septum of claim 1, wherein the septum is pre-pierced along the central axis.

8. The septum of claim 1, wherein the body includes a first portion and a second portion, the second portion including a recess sized and shaped to receive at least a portion of the first portion.

9. The septum of claim 8, wherein the chamber is formed between the first portion and the second portion.

10. The septum of claim 8, wherein the first portion is formed of a first elastomeric material, wherein the second portion is formed of a second elastomeric material, and wherein the first elastomeric material and second elastomeric material have different mechanical properties.

11. The septum of claim 8, wherein the first portion is cylindrically-shaped and wherein the recess is sized and shaped to receive at least a portion of the cylindrically-shaped first portion.

12. The septum of claim 11, wherein the first portion and the recess engage via a tongue-and-groove fit.

13. A method of using a chambered septum, comprising:
providing a septum according to claim 1;
inserting the bottom surface into a gas chromatography injection port; and
inserting a needle along the central axis serially through the top seal, the internal chamber, and the bottom seal.

14. The method of claim 13,
wherein the top surface includes an upper cavity;
wherein the central axis extends through the upper cavity; and
wherein the step of inserting the needle comprises inserting the needle along the central axis serially through the upper cavity, the top seal, the internal chamber, and the bottom seal.

15. The method of claim 13,
wherein the bottom surface includes a lower cavity;
wherein the central axis extends through the lower cavity; and
wherein the step of inserting the needle comprises inserting the needle along the central axis serially through the top seal, the internal chamber, the bottom seal, and the lower cavity.

16. The method of claim 13,
wherein the top surface includes an upper cavity;
wherein the bottom surface includes a lower cavity;
wherein the central axis extends through the upper cavity and the lower cavity; and
wherein the step of inserting the needle comprises inserting the needle along the central axis serially through the upper cavity, the top seal, the internal chamber, the bottom seal, and the lower cavity.

17. The method of claim 13, further comprising retracting the needle subsequent to the inserting.

18. The method of claim 17, wherein the step of retracting the needle comprises retracting the needle along the central axis serially through the bottom seal, the internal chamber, and the top seal.

19. The method of claim 17, wherein not more than 4 N of force is required for said inserting the needle and said retracting the needle.

20. A septum comprising:
a body formed of resilient, elastomeric material, the body having a top surface, a bottom surface, and at least one side extending between the top surface and the bottom surface, the body including
a central axis,
at least one internal chamber within the body, the central axis extending through the chamber, wherein the chamber is configured to reduce friction on a needle inserted or retracted therethrough,
an elastomeric top membrane seal between the at least one chamber and the top surface, and
an elastomeric bottom membrane seal between the at least one chamber and the bottom surface;
wherein both the top seal and bottom seal, with or without a needle inserted therethrough, substantially isolate the at least one chamber from an outside environment.

* * * * *